(12) United States Patent
Storm et al.

(10) Patent No.: US 9,494,952 B2
(45) Date of Patent: Nov. 15, 2016

(54) SYSTEMS AND METHODS FOR CONTROLLING MULTIPLE HVAC SYSTEMS

(75) Inventors: Timothy Wayne Storm, Tyler, TX (US); John Tanner Taylor, Flint, TX (US)

(73) Assignee: Trane International Inc., Piscataway, NJ (US)

( * ) Notice: Subject to any disclaimer, the term of this patent is extended or adjusted under 35 U.S.C. 154(b) by 187 days.

(21) Appl. No.: 13/077,269

(22) Filed: Mar. 31, 2011

(65) Prior Publication Data

US 2012/0253521 A1 Oct. 4, 2012

(51) Int. Cl.
| | |
|---|---|
| *G05B 19/18* | (2006.01) |
| *G06F 19/00* | (2011.01) |
| *G05B 15/00* | (2006.01) |
| *G05D 23/19* | (2006.01) |
| *G05B 15/02* | (2006.01) |
| *G05D 23/275* | (2006.01) |
| *G09G 5/00* | (2006.01) |
| *F24F 11/00* | (2006.01) |

(52) U.S. Cl.
CPC ........... *G05D 23/1905* (2013.01); *G05B 15/02* (2013.01); *F24F 2011/0067* (2013.01); *F24F 2011/0068* (2013.01); *G05B 2219/2642* (2013.01)

(58) Field of Classification Search
CPC .......... G05B 15/02; G05B 2219/2642; G05B 19/0423; G05B 23/0272; G05B 2219/23031; G05B 2219/2643; G05B 2219/31048; G05B 2219/23121; G05B 2219/25073; G05B 2219/32014; G06F 17/50; G06F 3/04886; G05D 23/1905; F24F 2011/0068; F24F 2011/0067

USPC ....... 700/19, 20, 174, 207–210, 276, 3, 277; 236/1 B, 25 R, 25 A, 44 R, 44 A, 44 B, 236/44 C, 90; 715/700–760; 345/661
See application file for complete search history.

(56) References Cited

U.S. PATENT DOCUMENTS

| | | | | |
|---|---|---|---|---|
| 4,364,512 | A | * | 12/1982 | Morrison ....................... 236/9 A |
| 4,430,828 | A | * | 2/1984 | Oglevee et al. .................. 47/17 |
| 5,105,183 | A | * | 4/1992 | Beckman ....................... 345/1.3 |
| 5,279,458 | A | | 1/1994 | DeWolf et al. |
| 5,348,078 | A | | 9/1994 | Dushane et al. |
| 5,385,297 | A | * | 1/1995 | Rein et al. ................... 236/49.3 |

(Continued)

OTHER PUBLICATIONS

Starsinic-M., "System Architecture Challenges in the Home M2M Network", IEEE, Apr. 27, 2010, 7 pages, specifically p. 2.*

*Primary Examiner* — Robert Fennema
*Assistant Examiner* — Thomas Stevens
(74) *Attorney, Agent, or Firm* — Conley Rose, P.C.; Michael J. Schofield; J. Robert Brown, Jr.

(57) ABSTRACT

An HVAC control system has a first system controller associated with a first HVAC system and configured to control the first HVAC system and a second system controller associated with a HVAC system and configured to control the second HVAC system wherein the first system controller is selectively operable to control the second HVAC system. A method of controlling multiple HVAC systems includes providing a first HVAC system which may include a required first system controller, providing a second HVAC system which may include a required second system controller, and enabling wireless communication between the first system controller and the second system controller.

21 Claims, 12 Drawing Sheets

(56) References Cited

U.S. PATENT DOCUMENTS

| | | |
|---|---|---|
| 5,419,489 A | 5/1995 | Burd |
| 5,520,328 A * | 5/1996 | Bujak, Jr. .................. 236/44 A |
| 5,751,572 A | 5/1998 | Maciulewicz |
| 5,833,134 A | 11/1998 | Ho et al. |
| 6,076,739 A * | 6/2000 | Littleford et al. ......... 236/44 R |
| 6,116,512 A | 9/2000 | Dushane et al. |
| 6,154,681 A * | 11/2000 | Drees et al. .................... 700/19 |
| 6,338,437 B1 | 1/2002 | Kline et al. |
| 6,363,422 B1 * | 3/2002 | Hunter et al. ............... 709/224 |
| 6,405,103 B1 * | 6/2002 | Ryan et al. .................. 700/275 |
| 6,453,689 B2 | 9/2002 | Wada |
| 6,460,356 B1 | 10/2002 | Tao et al. |
| 6,972,761 B1 * | 12/2005 | Cox et al. .................... 345/440 |
| 6,980,080 B2 | 12/2005 | Christensen et al. |
| 7,047,092 B2 * | 5/2006 | Wimsatt ........................ 700/83 |
| 7,139,239 B2 * | 11/2006 | McFarland ................... 370/228 |
| 7,156,316 B2 | 1/2007 | Kates |
| 7,394,367 B1 * | 7/2008 | Aupperle et al. ............ 340/540 |
| 7,433,740 B2 | 10/2008 | Hesse et al. |
| 7,448,435 B2 | 11/2008 | Garozzo |
| 7,455,236 B2 | 11/2008 | Kates |
| 7,455,237 B2 | 11/2008 | Kates |
| 7,730,935 B1 * | 6/2010 | Bujak, Jr. .................... 165/208 |
| 7,757,115 B2 * | 7/2010 | Shibayama et al. ........... 714/12 |
| 8,019,697 B2 * | 9/2011 | Ozog ........................... 705/412 |
| 8,172,154 B1 * | 5/2012 | Figley et al. ............... 236/44 A |
| 8,219,249 B2 * | 7/2012 | Harrod et al. ............... 700/276 |
| 8,442,693 B2 * | 5/2013 | Mirza et al. ................. 700/276 |
| 2002/0047774 A1 * | 4/2002 | Christensen et al. ........ 340/3.54 |
| 2003/0085929 A1 * | 5/2003 | Huber et al. ................. 345/810 |
| 2003/0216837 A1 * | 11/2003 | Reich et al. ................. 700/276 |
| 2004/0078832 A1 * | 4/2004 | Yang ............................ 725/146 |
| 2005/0040943 A1 * | 2/2005 | Winick ...................... 340/539.1 |
| 2005/0222861 A1 * | 10/2005 | Silverman et al. ............... 705/1 |
| 2006/0099904 A1 * | 5/2006 | Belt et al. .................... 454/236 |
| 2006/0142880 A1 * | 6/2006 | Deen et al. .................... 700/19 |
| 2006/0149395 A1 * | 7/2006 | Archacki et al. .............. 700/19 |
| 2006/0185373 A1 * | 8/2006 | Butler et al. ................... 62/181 |
| 2006/0250578 A1 * | 11/2006 | Pohl et al. .................... 351/210 |
| 2007/0192486 A1 * | 8/2007 | Wilson et al. ............... 709/225 |
| 2007/0244573 A1 * | 10/2007 | McFarland ..................... 700/20 |
| 2008/0097651 A1 * | 4/2008 | Shah et al. ................... 700/277 |
| 2008/0160799 A1 * | 7/2008 | Mulhouse et al. .............. 439/78 |
| 2008/0209342 A1 * | 8/2008 | Taylor et al. ................. 715/747 |
| 2008/0228325 A1 * | 9/2008 | Schindler ..................... 700/291 |
| 2008/0277486 A1 * | 11/2008 | Seem et al. ................. 236/49.3 |
| 2009/0005912 A1 * | 1/2009 | Srivastava et al. ........... 700/276 |
| 2009/0143918 A1 * | 6/2009 | Amundson ......... F24F 11/0086 700/278 |
| 2009/0166442 A1 * | 7/2009 | Stark ............................. 236/1 B |
| 2009/0195349 A1 * | 8/2009 | Frader-Thompson et al. ............................... 340/3.1 |
| 2009/0307255 A1 * | 12/2009 | Park ............................. 707/102 |
| 2010/0070907 A1 * | 3/2010 | Harrod et al. ................ 715/772 |
| 2010/0157990 A1 * | 6/2010 | Krzyzanowski et al. .... 370/352 |
| 2010/0235004 A1 * | 9/2010 | Thind ........................... 700/277 |
| 2010/0245259 A1 * | 9/2010 | Bairagi et al. ............... 345/173 |
| 2010/0307733 A1 * | 12/2010 | Karamanos et al. ......... 165/254 |
| 2010/0318200 A1 * | 12/2010 | Foslien et al. .................. 700/83 |
| 2011/0031322 A1 * | 2/2011 | Zou et al. ..................... 236/1 B |
| 2011/0088000 A1 * | 4/2011 | Mackay .................. G06T 19/00 715/853 |
| 2011/0107220 A1 * | 5/2011 | Perlman ................. A63F 13/12 715/720 |
| 2012/0012662 A1 * | 1/2012 | Leen et al. ...................... 236/51 |
| 2012/0182244 A1 * | 7/2012 | Arthur .................... G06F 3/023 345/173 |
| 2012/0239221 A1 * | 9/2012 | Mighdoll ............. F24F 11/0012 700/300 |
| 2012/0254792 A1 * | 10/2012 | Husoy .................. G06F 3/0481 715/782 |
| 2013/0167035 A1 * | 6/2013 | Imes et al. ................... 715/736 |
| 2015/0268674 A1 * | 9/2015 | Mucignat ............ G05D 23/193 700/276 |

* cited by examiner

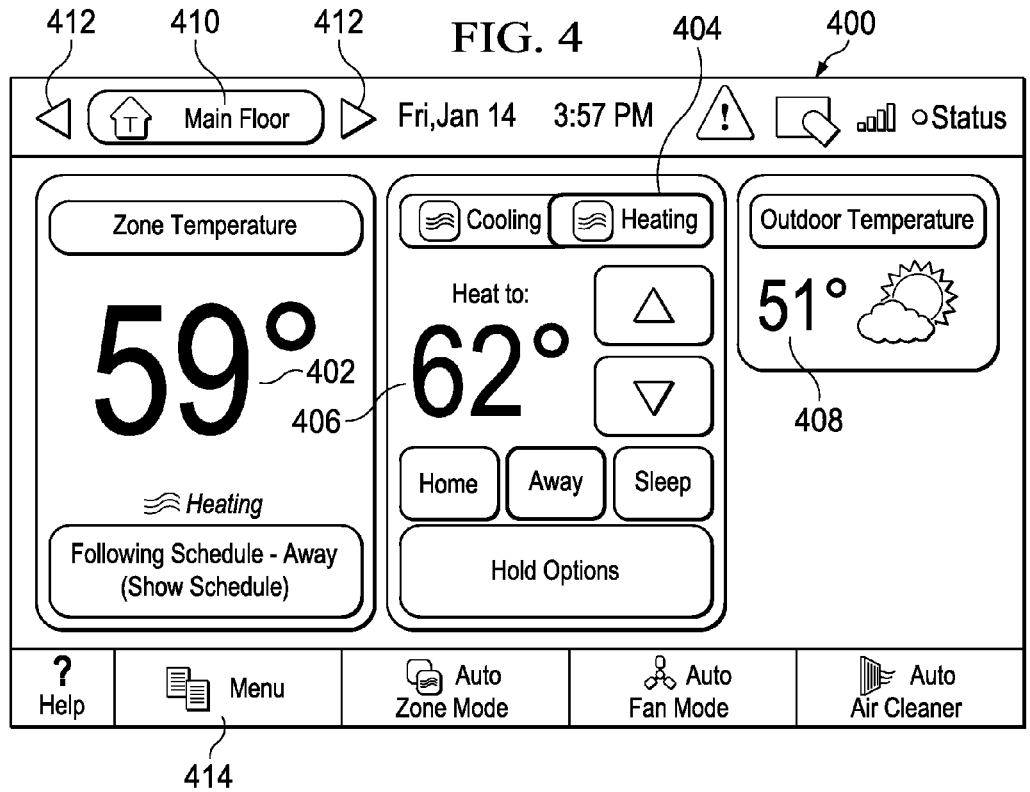
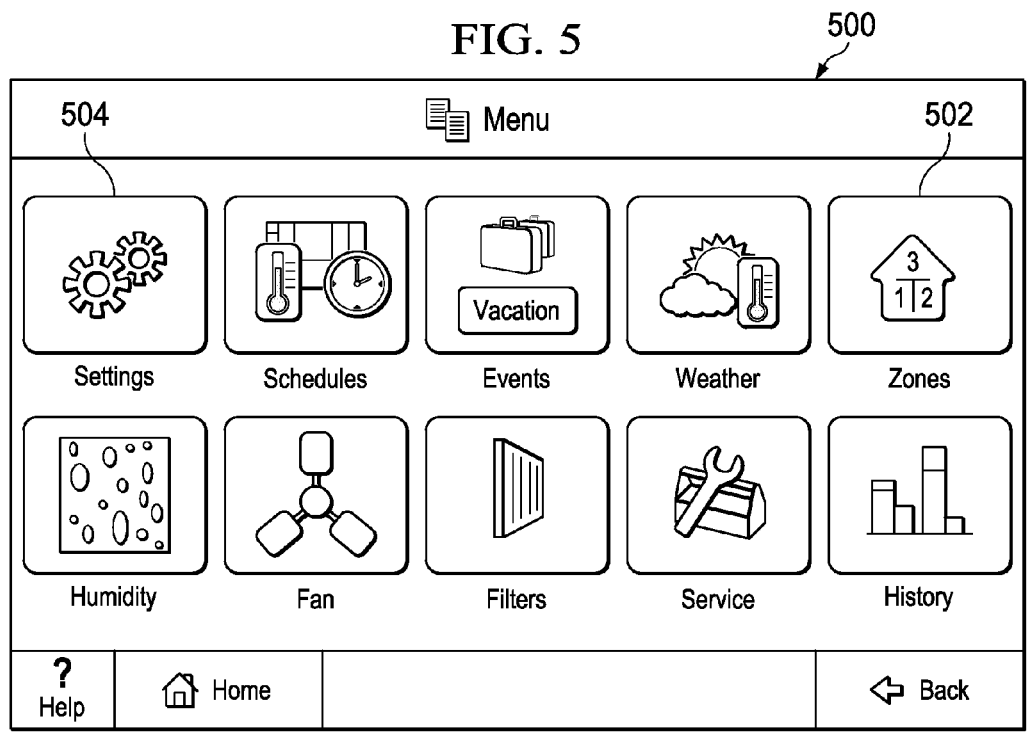

SYSTEMS AND METHODS FOR CONTROLLING MULTIPLE HVAC SYSTEMS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Some structures are outfitted with more than one heating, ventilation, and air conditioning (HVAC) system. Similarly, some facilities may comprise a plurality of structures, each structure being outfitted with one or more HVAC systems. In some cases, each of the above-described HVAC systems may comprise its own user interface and/or thermostat for monitoring and/or controlling operation of the HVAC systems.

SUMMARY OF THE DISCLOSURE

In some embodiments of the disclosure, an HVAC control system is provided that comprises a first system controller associated with a first HVAC system and configured to control the first HVAC system and a second system controller associated with a HVAC system and configured to control the second HVAC system, wherein the first system controller is selectively operable to control the second HVAC system.

In other embodiments of the disclosure, a method of controlling multiple HVAC systems comprises providing a first HVAC system comprising a required first system controller, providing a second HVAC system comprising a required second system controller, and enabling wireless communication between the first system controller and the second system controller.

In yet other embodiments of the disclosure, an HVAC system is provided that comprises a first air conditioning system comprising a first wired system controller configured to control the first air conditioning system via a first wired communication bus and a second air conditioning system comprising a second wired system controller configured to control the second air conditioning system via a second wired communication bus. Each of the first wired system controller and the second wired system controller are configured for selective wireless communication with each other using an IEEE 802.11 wireless communication protocol.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

FIG. 4 is a home display of a system controller of the HVAC system of FIG. 1;

FIG. 5 is a main menu of the system controller of the HVAC system of FIG. 1;

DETAILED DESCRIPTION

Some facilities comprise one or more structures outfitted with one or more HVAC systems. In some HVAC systems, a user interface may be integrated into a system controller and the thermostat and/or system controller may be generally colocated with the system controller. In some cases, a first system controller of a first HVAC system may not be able to monitor and/or control a second HVAC system despite (1) a relatively short distance between the first HVAC system and the second HVAC system, (2) the first HVAC system and the second HVAC system both being located on substantially the same premises, and/or (3) the first system controller and the second system controller (associated with the second HVAC system) both being located on substantially the same premises. As such, a user of the first HVAC system and the second HVAC system may be required to use the first system controller to control and/or monitor the first HVAC system and further be required to use the second system controller to control and/or monitor the second HVAC system.

In some cases, the first system controller and the second system controller may be located very near each other. In other cases, the first system controller may be located so that a user is required to move between the location of the first system controller and the second system controller to switch between using the first system controller and the second system controller. When a first system controller and a second system controller are located very near each other, it may be inconvenient to require a user to discontinue use of one of the system controllers and to begin use of the other system controller in order to switch between controlling the first HVAC system and the second HVAC system. When a first system controller and a second system controller are located substantially apart from each other, it may be inconvenient to require physical travel between the first system controller and the second system controller to switch between controlling the first HVAC system and the second HVAC system. Accordingly, this disclosure provides systems and methods for monitoring and/or controlling multiple HVAC systems via a single user interface of a system controller of one of the multiple HVAC systems. In some embodiments, a single user interface of a system controller may be configured to monitor and/or control as many as eight HVAC systems including the HVAC system with which the system controller is primarily associated.

Figure 1:
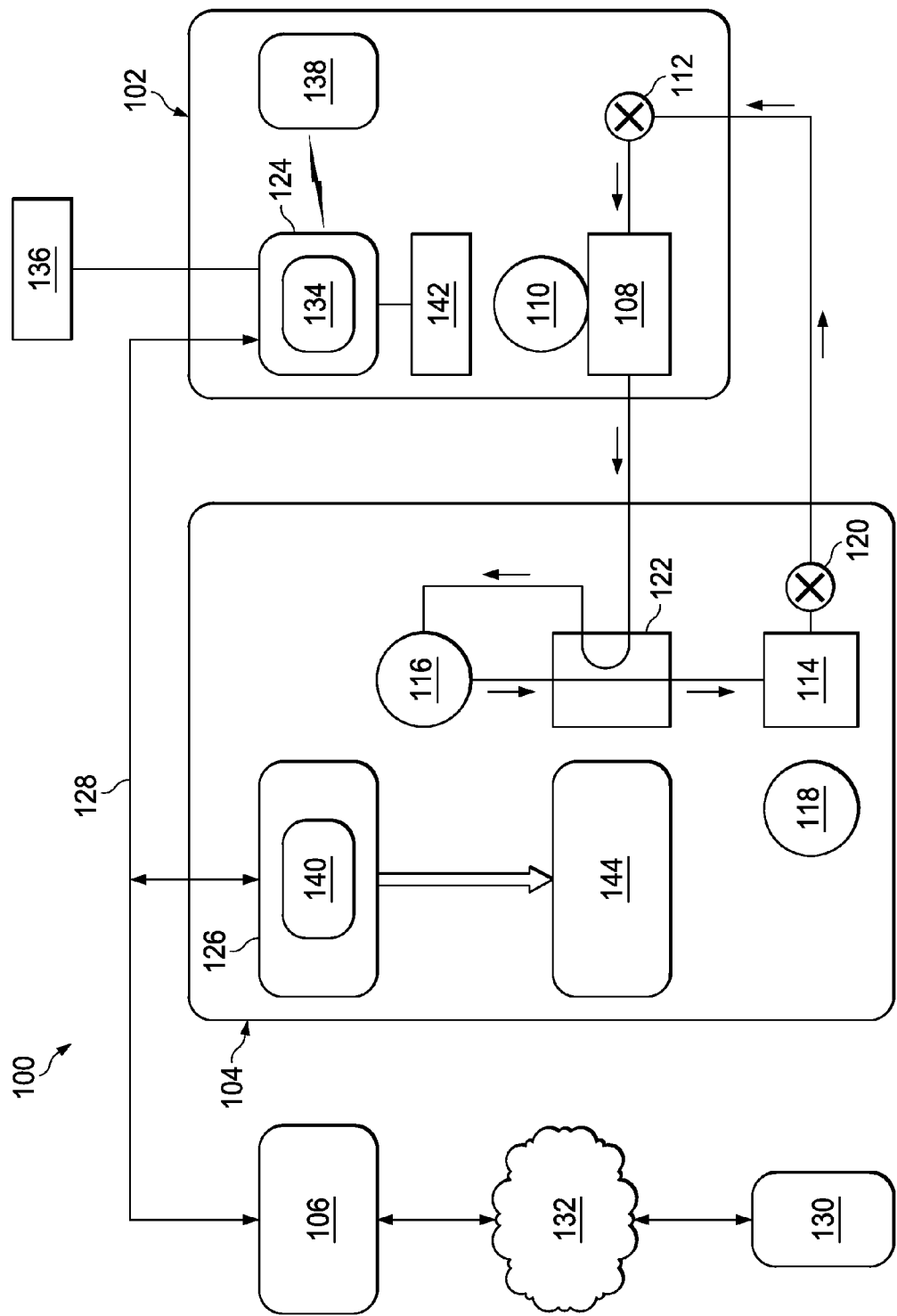
FIG. 1 is simplified schematic diagram of an HVAC system according to an embodiment of the disclosure.

Referring now to FIG. 1, a simplified schematic diagram of an HVAC system 100 according to an embodiment of this disclosure is shown. HVAC system 100 comprises an indoor unit 102, an outdoor unit 104, and a system controller 106. In some embodiments, the system controller 106 may operate to control operation of the indoor unit 102 and/or the outdoor unit 104. As shown, the HVAC system 100 is a so-called heat pump system that may be selectively operated to implement one or more substantially closed thermodynamic refrigeration cycles to provide a cooling functionality and/or a heating functionality.

Indoor unit 102 comprises an indoor heat exchanger 108, an indoor fan 110, and an indoor metering device 112. Indoor heat exchanger 108 is a plate fin heat exchanger configured to allow heat exchange between refrigerant carried within internal tubing of the indoor heat exchanger 108 and fluids that contact the indoor heat exchanger 108 but that are kept segregated from the refrigerant. In other embodiments, indoor heat exchanger 108 may comprise a spine fin heat exchanger, a microchannel heat exchanger, or any other suitable type of heat exchanger.

The indoor fan 110 is a centrifugal blower comprising a blower housing, a blower impeller at least partially disposed within the blower housing, and a blower motor configured to selectively rotate the blower impeller. In other embodiments, the indoor fan 110 may comprise a mixed-flow fan and/or any other suitable type of fan. The indoor fan 110 is configured as a modulating and/or variable speed fan capable of being operated at many speeds over one or more ranges of speeds. In other embodiments, the indoor fan 110 may be configured a multiple speed fan capable of being operated at a plurality of operating speeds by selectively electrically powering different ones of multiple electromagnetic windings of a motor of the indoor fan 110. In yet other embodiments, the indoor fan 110 may be a single speed fan.

The indoor metering device 112 is an electronically controlled motor driven electronic expansion valve (EEV). In alternative embodiments, the indoor metering device 112 may comprise a thermostatic expansion valve, a capillary tube assembly, and/or any other suitable metering device. The indoor metering device 112 may comprise and/or be associated with a refrigerant check valve and/or refrigerant bypass for use when a direction of refrigerant flow through the indoor metering device 112 is such that the indoor metering device 112 is not intended to meter or otherwise substantially restrict flow of the refrigerant through the indoor metering device 112.

Outdoor unit 104 comprises an outdoor heat exchanger 114, a compressor 116, an outdoor fan 118, an outdoor metering device 120, and a reversing valve 122. Outdoor heat exchanger 114 is a microchannel heat exchanger configured to allow heat exchange between refrigerant carried within internal passages of the outdoor heat exchanger 114 and fluids that contact the outdoor heat exchanger 114 but that are kept segregated from the refrigerant. In other embodiments, outdoor heat exchanger 114 may comprise a spine fin heat exchanger, a plate fin heat exchanger, or any other suitable type of heat exchanger.

The compressor 116 is a multiple speed scroll type compressor configured to selectively pump refrigerant at a plurality of mass flow rates. In alternative embodiments, the compressor 116 may comprise a modulating compressor capable of operation over one or more speed ranges, the compressor 116 may comprise a reciprocating type compressor, the compressor 116 may be a single speed compressor, and/or the compressor 116 may comprise any other suitable refrigerant compressor and/or refrigerant pump.

The outdoor fan 118 is an axial fan comprising a fan blade assembly and fan motor configured to selectively rotate the fan blade assembly. In other embodiments, the outdoor fan 118 may comprise a mixed-flow fan, a centrifugal blower, and/or any other suitable type of fan and/or blower. The outdoor fan 118 is configured as a modulating and/or variable speed fan capable of being operated at many speeds over one or more ranges of speeds. In other embodiments, the outdoor fan 118 may be configured as a multiple speed fan capable of being operated at a plurality of operating speeds by selectively electrically powering different ones of multiple electromagnetic windings of a motor of the outdoor fan 118. In yet other embodiments, the outdoor fan 118 may be a single speed fan.

The outdoor metering device 120 is a thermostatic expansion valve. In alternative embodiments, the outdoor metering device 120 may comprise an electronically controlled motor driven EEV, a capillary tube assembly, and/or any other suitable metering device. The outdoor metering device 120 may comprise and/or be associated with a refrigerant check valve and/or refrigerant bypass for use when a direction of refrigerant flow through the outdoor metering device 120 is such that the outdoor metering device 120 is not intended to meter or otherwise substantially restrict flow of the refrigerant through the outdoor metering device 120.

The reversing valve 122 is a so-called four-way reversing valve. The reversing valve 122 may be selectively controlled to alter a flow path of refrigerant in the HVAC system 100 as described in greater detail below. The reversing valve 122 may comprise an electrical solenoid or other device configured to selectively move a component of the reversing valve 122 between operational positions.

The system controller 106 may comprise a touchscreen interface for displaying information and for receiving user inputs. The system controller 106 may display information related to the operation of the HVAC system 100 and may receive user inputs related to operation of the HVAC system 100. However, the system controller 106 may further be operable to display information and receive user inputs tangentially and/or unrelated to operation of the HVAC system 100. In some embodiments, the system controller 106 may selectively communicate with an indoor controller 124 of the indoor unit 102, with an outdoor controller 126 of the outdoor unit 104, and/or with other components of the HVAC system 100. In some embodiments, the system controller 106 may be configured for selective bidirectional communication over a communication bus 128. In some embodiments, portions of the communication bus 128 may comprise a three-wire connection suitable for communicating messages between the system controller 106 and one or more of the HVAC system 100 components configured for interfacing with the communication bus 128. Still further, the system controller 106 may be configured to selectively communicate with HVAC system 100 components and/or other device 130 via a communication network 132. In some embodiments, the communication network 132 may comprise a telephone network and the other device 130 may comprise a telephone. In some embodiments, the communication network 132 may comprise the Internet and the other device 130 may comprise a so-called smartphone and/or other Internet enabled mobile telecommunication device.

The indoor controller 124 may be carried by the indoor unit 102 and may be configured to receive information inputs, transmit information outputs, and otherwise communicate with the system controller 106, the outdoor controller 126, and/or any other device via the communication bus 128 and/or any other suitable medium of communication. In some embodiments, the indoor controller 124 may be configured to communicate with an indoor personality module 134, receive information related to a speed of the indoor fan 110, transmit a control output to an electric heat relay, transmit information regarding an indoor fan 110 volumetric flow-rate, communicate with and/or otherwise affect control over an air cleaner 136, and communicate with an indoor EEV controller 138. In some embodiments, the indoor controller 124 may be configured to communicate with an indoor fan controller 142 and/or otherwise affect control over operation of the indoor fan 110. In some embodiments, the indoor personality module 134 may comprise information related to the identification and/or operation of the indoor unit 102.

In some embodiments, the indoor EEV controller 138 may be configured to receive information regarding temperatures and pressures of the refrigerant in the indoor unit 102. More specifically, the indoor EEV controller 138 may be configured to receive information regarding temperatures and pressures of refrigerant entering, exiting, and/or within the indoor heat exchanger 108. Further, the indoor EEV controller 138 may be configured to communicate with the indoor metering device 112 and/or otherwise affect control over the indoor metering device 112.

The outdoor controller 126 may be carried by the outdoor unit 104 and may be configured to receive information inputs, transmit information outputs, and otherwise communicate with the system controller 106, the indoor controller 124, and/or any other device via the communication bus 128 and/or any other suitable medium of communication. In some embodiments, the outdoor controller 126 may be configured to communicate with an outdoor personality module 140 that may comprise information related to the identification and/or operation of the outdoor unit 104. In some embodiments, the outdoor controller 126 may be configured to receive information related to an ambient temperature associated with the outdoor unit 104, information related to a temperature of the outdoor heat exchanger 114, and/or information related to refrigerant temperatures and/or pressures of refrigerant entering, exiting, and/or within the outdoor heat exchanger 114 and/or the compressor 116. In some embodiments, the outdoor controller 126 may be configured to transmit information related to monitoring, communicating with, and/or otherwise affecting control over the outdoor fan 118, a compressor sump heater, a solenoid of the reversing valve 122, a relay associated with adjusting and/or monitoring a refrigerant charge of the HVAC system 100, a position of the indoor metering device 112, and/or a position of the outdoor metering device 120. The outdoor controller 126 may further be configured to communicate with a compressor drive controller 144 that is configured to electrically power and/or control the compressor 116.

The HVAC system 100 is shown configured for operating in a so-called cooling mode in which heat is absorbed by refrigerant at the indoor heat exchanger 108 and heat is rejected from the refrigerant at the outdoor heat exchanger 114. In some embodiments, the compressor 116 may be operated to compress refrigerant and pump the relatively high temperature and high pressure compressed refrigerant from the compressor 116 to the outdoor heat exchanger 114 through the reversing valve 122 and to the outdoor heat exchanger 114. As the refrigerant is passed through the outdoor heat exchanger 114, the outdoor fan 118 may be operated to move air into contact with the outdoor heat exchanger 114, thereby transferring heat from the refrigerant to the air surrounding the outdoor heat exchanger 114. The refrigerant may primarily comprise liquid phase refrigerant and the refrigerant may be pumped from the outdoor heat exchanger 114 to the indoor metering device 112 through and/or around the outdoor metering device 120 which does not substantially impede flow of the refrigerant in the cooling mode. The indoor metering device 112 may meter passage of the refrigerant through the indoor metering device 112 so that the refrigerant downstream of the indoor metering device 112 is at a lower pressure than the refrigerant upstream of the indoor metering device 112. The pressure differential across the indoor metering device 112 allows the refrigerant downstream of the indoor metering device 112 to expand and/or at least partially convert to gaseous phase. The gaseous phase refrigerant may enter the indoor heat exchanger 108. As the refrigerant is passed through the indoor heat exchanger 108, the indoor fan 110 may be operated to move air into contact with the indoor heat exchanger 108, thereby transferring heat to the refrigerant from the air surrounding the indoor heat exchanger 108. The refrigerant may thereafter reenter the compressor 116 after passing through the reversing valve 122.

To operate the HVAC system 100 in the so-called heating mode, the reversing valve 122 may be controlled to alter the flow path of the refrigerant, the indoor metering device 112 may be disabled and/or bypassed, and the outdoor metering device 120 may be enabled. In the heating mode, refrigerant may flow from the compressor 116 to the indoor heat exchanger 108 through the reversing valve 122, the refrigerant may be substantially unaffected by the indoor metering device 112, the refrigerant may experience a pressure differential across the outdoor metering device 120, the refrigerant may pass through the outdoor heat exchanger 114, and the refrigerant may reenter the compressor 116 after passing through the reversing valve 122. Most generally, operation of the HVAC system 100 in the heating mode reverses the roles of the indoor heat exchanger 108 and the outdoor heat exchanger 114 as compared to their operation in the cooling mode.

Figure 2:
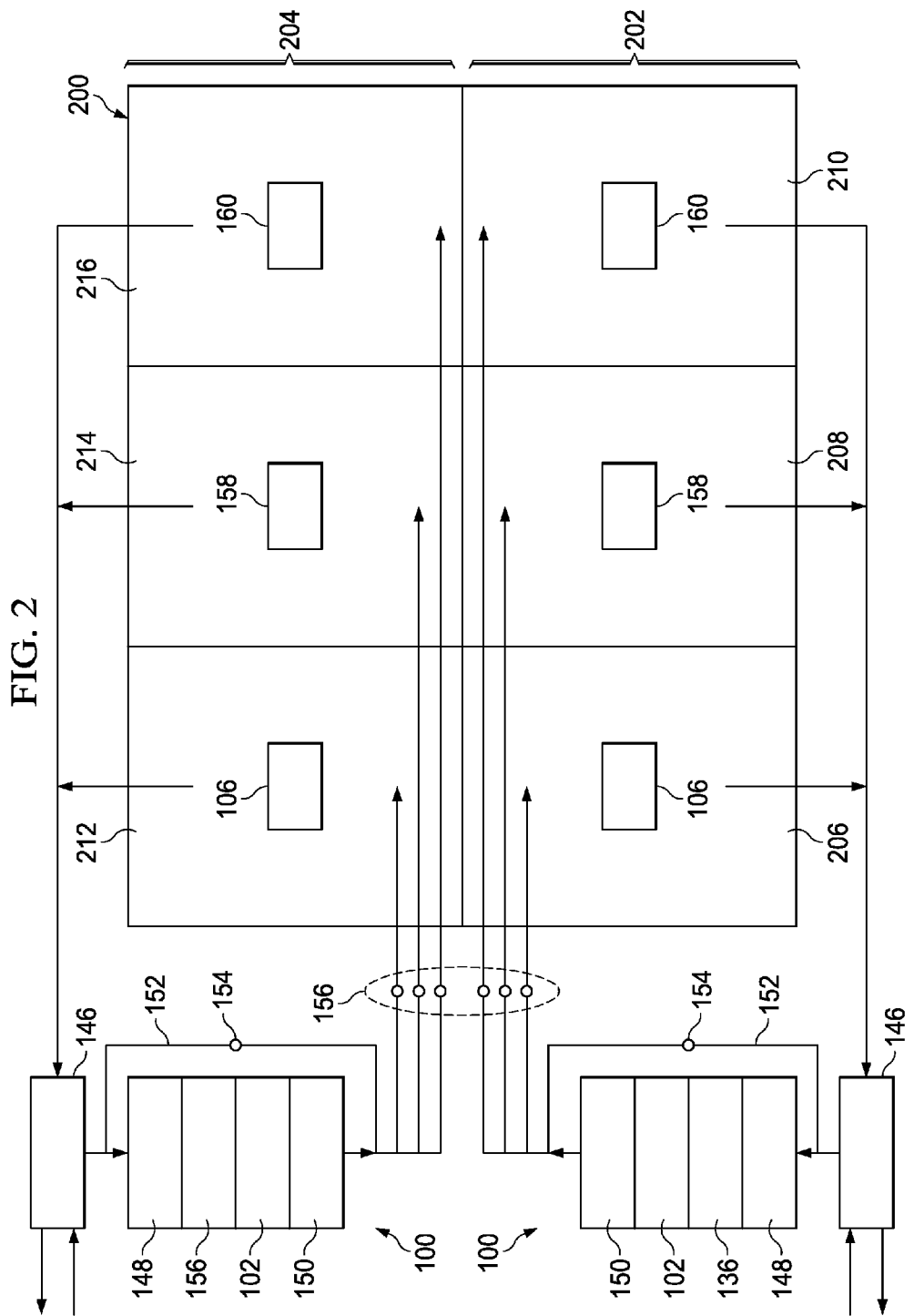
FIG. 2 is a simplified schematic diagram of the air circulation paths of the HVAC system of FIG. 1.

Referring now to FIG. 2, a simplified schematic diagram of the air circulation paths for a structure 200 conditioned by two HVAC systems 100 is shown. In this embodiment, the structure 200 is conceptualized as comprising a lower floor 202 and an upper floor 204. The lower floor 202 comprises zones 206, 208, and 210 while the upper floor 204 comprises zones 212, 214, and 216. The HVAC system 100 associated with the lower floor 202 is configured to circulate and/or condition air of lower zones 206, 208, and 210 while the HVAC system 100 associated with the upper floor 204 is configured to circulate and/or condition air of upper zones 212, 214, and 216.

In addition to the components of HVAC system 100 described above, in this embodiment, each HVAC system 100 further comprises a ventilator 146, a prefilter 148, a humidifier 150, and a bypass duct 152. The ventilator 146 may be operated to selectively exhaust circulating air to the environment and/or introduce environmental air into the circulating air. The prefilter 148 may generally comprise a filter media selected to catch and/or retain relatively large particulate matter prior to air exiting the prefilter 148 and entering the air cleaner 136. The humidifier 150 may be operated to adjust a humidity of the circulating air. The bypass duct 152 may be utilized to regulate air pressures within the ducts that form the circulating air flow paths. In some embodiments, air flow through the bypass duct 152 may be regulated by a bypass damper 154 while air flow delivered to the zones 206, 208, 210, 212, 214, and 216 may be regulated by zone dampers 156.

Still further, each HVAC system 100 may further comprise a zone thermostat 158 and a zone sensor 160. In some embodiments, a zone thermostat 158 may communicate with the system controller 106 and may allow a user to control a temperature, humidity, and/or other environmental setting for the zone in which the zone thermostat 158 is located. Further, the zone thermostat 158 may communicate with the system controller 106 to provide temperature, humidity, and/or other environmental feedback regarding the zone in which the zone thermostat 158 is located. In some embodiments, a zone sensor 160 may communicate with the system controller 106 to provide temperature, humidity, and/or other environmental feedback regarding the zone in which the zone sensor 160 is located.

While HVAC systems 100 are shown as a so-called split system comprising an indoor unit 102 located separately from the outdoor unit 104, alternative embodiments of an HVAC system 100 may comprise a so-called package system in which one or more of the components of the indoor unit 102 and one or more of the components of the outdoor unit 104 are carried together in a common housing or package. The HVAC system 100 is shown as a so-called ducted system where the indoor unit 102 is located remote from the conditioned zones, thereby requiring air ducts to route the circulating air. However, in alternative embodiments, an HVAC system 100 may be configured as a non-ducted system in which the indoor unit 102 and/or multiple indoor units 102 associated with an outdoor unit 104 is located substantially in the space and/or zone to be conditioned by the respective indoor units 102, thereby not requiring air ducts to route the air conditioned by the indoor units 102.

Still referring to FIG. 2, the system controllers 106 may be configured for bidirectional communication with each other and may further be configured so that a user may, using any of the system controllers 106, monitor and/or control any of the HVAC system 100 components regardless of which zones the components may be associated. Further, each system controller 106, each zone thermostat 158, and each zone sensor 160 may comprise a humidity sensor. As such, it will be appreciated that structure 200 is equipped with a plurality of humidity sensors in a plurality of different locations. In some embodiments, a user may effectively select which of the plurality of humidity sensors is used to control operation of one or more of the HVAC systems 100.

Figure 3:
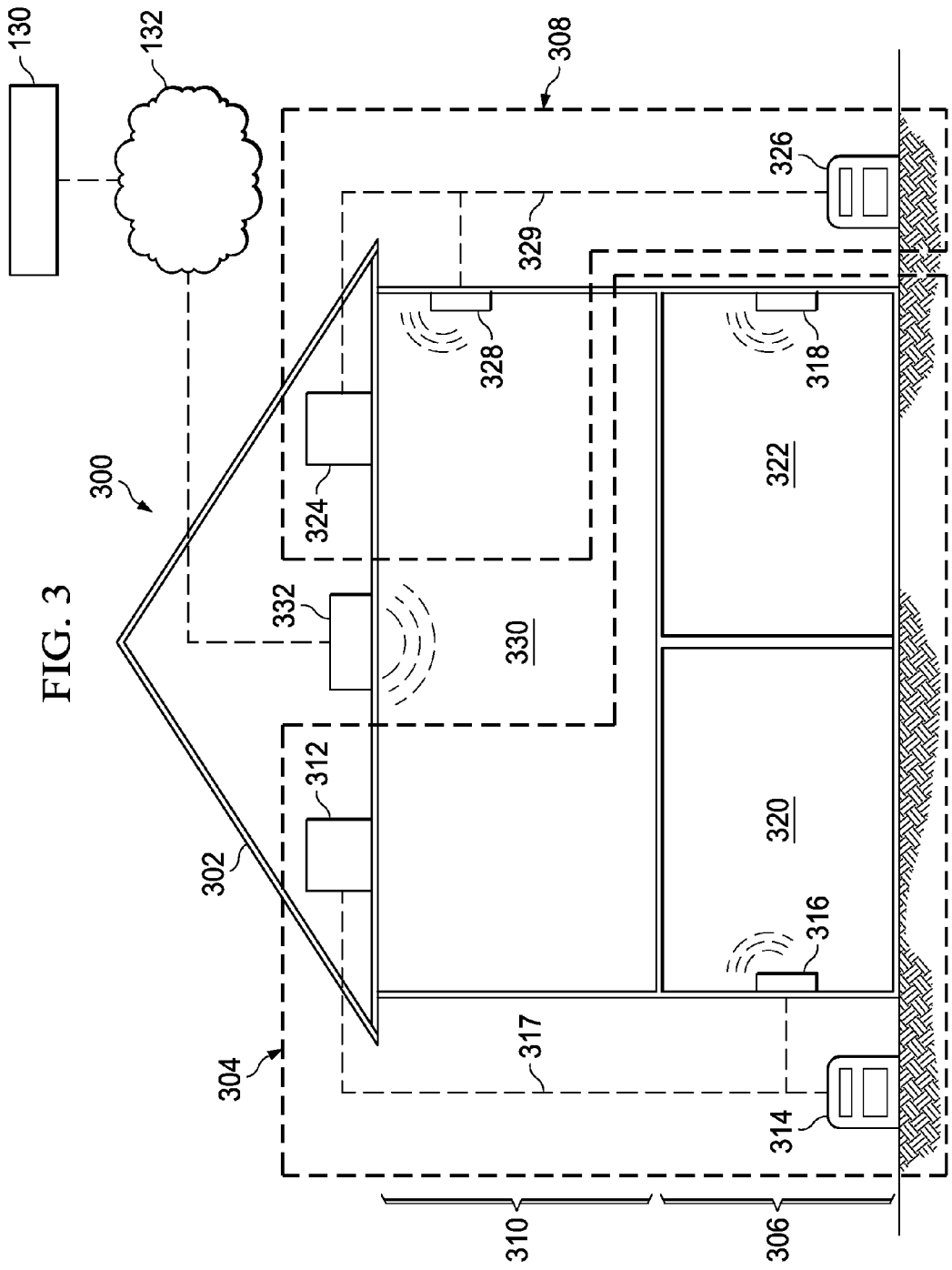
FIG. 3 a simplified schematic diagram of an HVAC control system.

Referring now to FIG. 3, a simplified schematic diagram of an HVAC control system 300 is shown. The HVAC control system 300 is explained herein as applied to a two-story structure 302 that is outfitted with two HVAC systems, namely, a so-called "System 10" first HVAC system 304 associated with a first level and/or downstairs 306 of structure 302 and a so-called "System 20" second HVAC system 308 associated with a second level and/or upstairs 310 of structure 302.

The first HVAC system 304 is substantially similar to the HVAC system 100 and comprises an indoor unit 312, an outdoor unit 314, a first system controller 316, and a zone thermostat 318. In this embodiment, the first system controller 316 comprises components configured to allow the first system controller 316 to accomplish bidirectional wireless communication over a wireless network, such as, but not limited to, a wireless network employing IEEE 802.11 communication protocol standards. In some embodiments, the zone thermostat 318 may be configured to communicate directly and/or indirectly with the first system controller 316 using a different and/or additional wireless communication protocol and/or method from the IEEE 802.11 communication protocol. The first level 306 is divided into two zones, namely, a main floor 320 and a family room 322. In this embodiment, the first system controller 316 may communicate with each of the indoor unit 312 and the outdoor unit 314 via a bidirectional physical communication bus 317. While the above-described physical communication bus 317 is required in this embodiment, in other embodiments, communication between the components of the HVAC system 304 may be accomplished wirelessly or via any other suitable communication method.

The second HVAC system 308 is substantially similar to the HVAC system 100 and comprises an indoor unit 324, an outdoor unit 326, and a second system controller 328. In this embodiment, the second system controller 328 comprises components configured to allow the second system controller 328 to accomplish bidirectional wireless communication over a wireless network, such as, but not limited to, a wireless network employing IEEE 802.11 communication protocol standards. The second level 310 comprises a single zone, namely, the upstairs 330. In this embodiment, the second system controller 328 may communicate with each of the indoor unit 324 and the outdoor unit 326 via a bidirectional physical communication bus 329. While the above-described physical communication bus 329 is required in this embodiment, in other embodiments, communication between the components of the HVAC system 308 may be accomplished wirelessly or via any other suitable communication method.

The HVAC control system 300 further comprises a bidirectional wireless communication router 332. The router 332 comprises components to allow the router 332 to accomplish bidirectional wireless communication over a wireless network, such as, but not limited to, a wireless network employing IEEE 802.11 communication protocol standards. In some embodiments, router 332 may further be configured to assign network addresses to one or more of the first system controller 316 and the second system controller 328. The network addresses may be assigned according to a protocol, such as, but not limited to, a dynamic host configuration protocol (DHCP) so that each of the first system controller 316 and the second system controller 328 are assigned different and unique Internet protocol addresses on the wireless network created by the router 332. In some embodiments, the router 332 may further be configured for communication with an off-premises and/or device such as a so-called smartphone device 130 via another communication network 132 such as the Internet or any other so-called wide-area network.

Utilizing the above-described wireless communication capabilities of the first system controller 316, second system controller 328, and router 332, the HVAC control system 300 may be operated to allow a user interface of a single system controller to monitor and/or control multiple HVAC systems. For example, the user interface of the first system controller 316 may be configured to monitor and/or control the conditions and/or operating parameters associated with the zones of both the first HVAC system 304 and/or the second HVAC system 308. Similarly, the user interface of the second system controller 328 and be configured to monitor and/or control the conditions and/or operating parameters associated with the zones of both the first HVAC system 304 and/or the second HVAC system 308. Such flexibility in controlling multiple HVAC systems via a single user interface may, in some embodiments, reduce a need for a user to physically travel between a location of the first system controller 316 and the second system controller 328 to control the first HVAC system 304 and the second HVAC system 308, respectively.

In this embodiment, each of the first system controller 316 and the second system controller 328 may be selectively configured between a so-called independent state of operation and a so-called cooperative state of operation. When operating according to the independent state of operation, a system controller is configured not to communicate with another system controller, not to share information with another system controller, and/or not to allow control parameters of the system controller to be adjusted by another system controller. When operating according to the cooperative state of operation, a system controller is configured to communicate with another system controller, share information with another system controller, and/or allow control parameters of the system controller to be adjusted by another system controller.

Referring now to FIG. 4, a home display 400 of first system controller 316 is shown. The home display 400 is shown as displaying a measured temperature 402 of main floor 320, an indication 404 regarding whether the system controller 316 is displaying control parameter information related to a heating or cooling mode, a current heating and/or cooling temperature set point 406, a measured outdoor and/or ambient temperature 408, other first HVAC system 304 operational settings, and/or other first HVAC system 304 status information. In this embodiment, the home display 400 comprises a zone indicia 410 that indicates zone for which some of the above-described control parameters and/or temperature feedback is being displayed. Zone selectors 412 may allow a user to selectively scroll through a list of zones for which first system controller 316 is configured to monitor and/or control. In this embodiment, first system controller 316 is configurable to monitor and/or control zones of a first level 306 and/or the second level 310. As such, in some cases where the first system controller 316 is configured to monitor and/or control zones of both the first level 306 and the second level 310, a user may selectively operate zone selectors 412 to selectively monitor and/or control zones associated with multiple HVAC systems. The home display 400 further comprises a virtual button 414. The virtual button 414 is selectively operable to cause the first system controller 316 to present a main menu 500 as shown in FIG. 5.

Referring now to FIG. 5, the main menu 500 comprises a plurality of virtual buttons configured to allow a user to navigate to a plurality of additional menus and displays. The main menu 500 comprises a virtual button 502 that is selectively operable to cause the first system controller 316 to present a zone menu 600 of FIG. 6.

Figure 6:
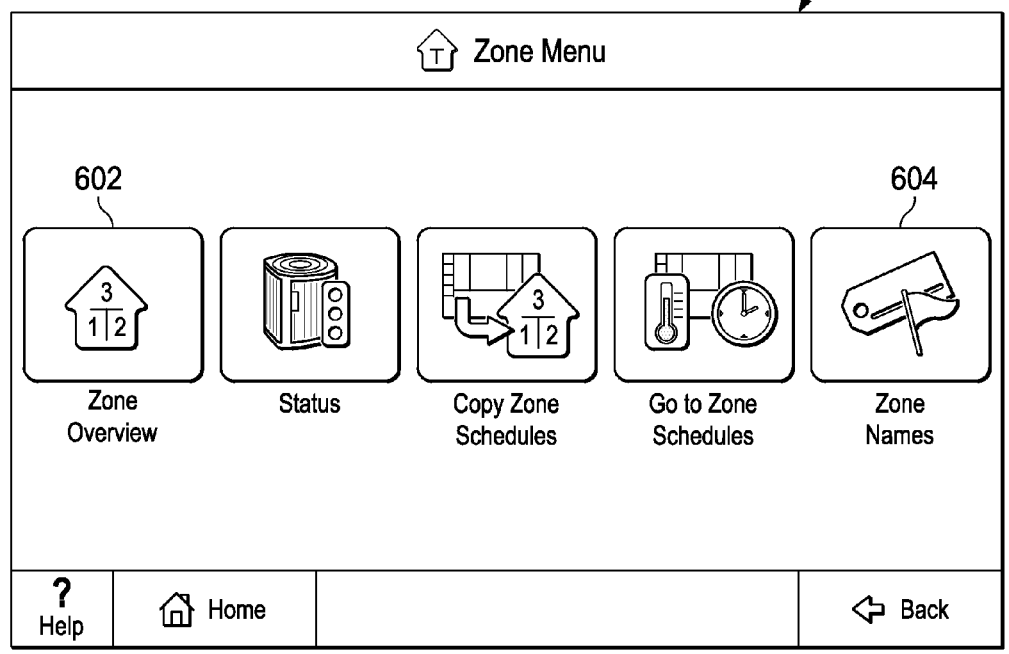
FIG. 6 is a zone menu of the system controller of the HVAC system of FIG. 1.

Referring now to FIG. 6, the zone menu 600 comprises a plurality of virtual buttons configured to allow a user to navigate to a plurality of additional menus and display related to monitoring and/or controlling HVAC zones. The zone menu 600 comprises a virtual button 602 that is selectively operable to cause the first system controller 316 to present a zone overview 700 of FIG. 7.

Figure 7:
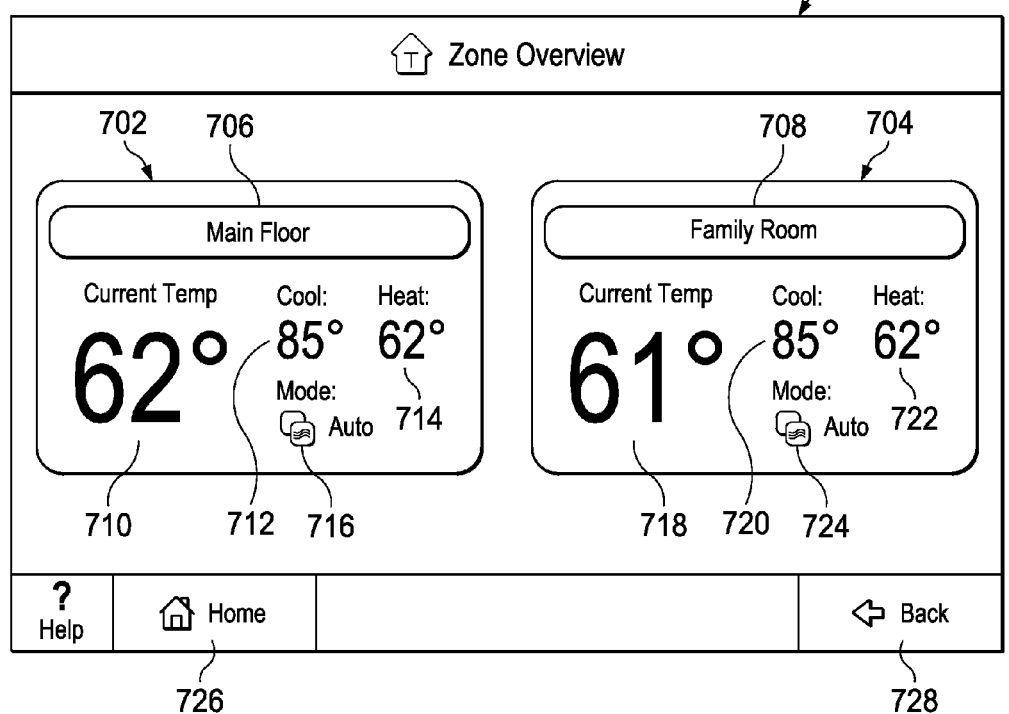
FIG. 7 is a zone overview of the system controller of the HVAC system of FIG. 1.

Referring now to FIG. 7, the zone overview 700 is shown. The zone overview 700 comprises a graphical representation of the one or more HVAC zones for which the first system controller 316 is configured to control and/or monitor. In the embodiment shown in FIG. 7, the first system controller 316 is in configured to operate in an independent state of operation wherein the first system controller 316 is configured to control and/or monitor HVAC zones of the first HVAC system 304. More particularly, FIG. 7 shows that the first system controller 316 is configured to control and/or monitor the main floor 320 and the family room 322 of HVAC system 304. In the embodiment shown, the first system controller 316 displays a main floor information group 702 and a family room information group 704 as indicated by the family room title 706 and the main floor title 708, respectively. The main floor information group 702 comprises a main floor current temperature 710, a main floor cooling temperature set point 712, a main floor heating temperature set point 714, and a main floor mode indicia 716. Similarly, the family room information group 704 comprises a family room current temperature 718, a family room cooling temperature set point 720, a family room heating temperature set point 722, and a family room mode indicia 724. Accordingly, the zone overview 700 may provide a user a convenient display for showing the operational and temperature status of the main floor 320 and the family room 322. The zone overview 700 further comprises a virtual button 726 that may cause the first system controller 316 to resume display of the home display 400. The zone overview 700 further comprises a virtual button 728 that may cause the first system controller 316 to resume display of the zone menu 600.

Figure 8:
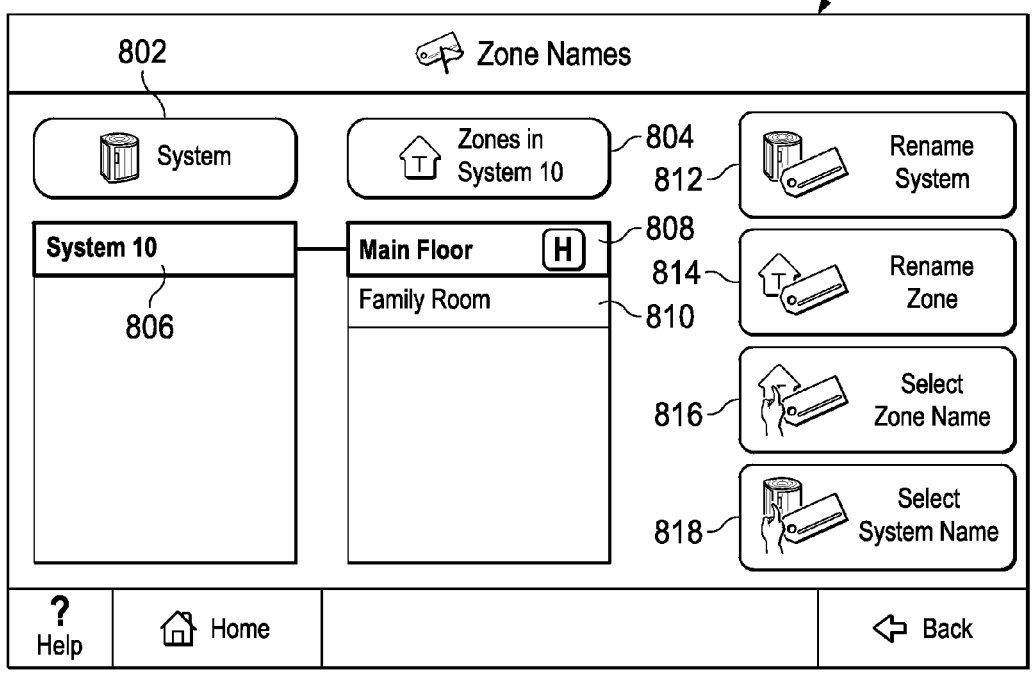
FIG. 8 is a zone names display of the system controller of the HVAC system of FIG. 1.

Referring now to FIG. 8, a zone names display 800 is shown. The zone names display 800 may be displayed as a result of operating a virtual button 604 of zone menu 600. The zone names display 800 may provide a display of the systems and zone for which the first system controller 316 is configured to control and/or monitor. In some embodiments, the zone names display 800 comprises a system column 802 and a zones column 804. While the first system controller 316 is in an independent state of operation, only the first HVAC system 304 is indicated in the system column 802. In this embodiment, the first HVAC system 304 is represented by the first HVAC system textual label 806 comprising the phrase, "System 10." With first HVAC system textual label 806 selected, the zones column 804 is populated with a main floor textual label 808 and a family room textual label 810. The zone names display 800 further comprises virtual buttons 812, 814, 816, and 818 that may allow a user to rename an HVAC system textual label, rename a zone textual label, select a zone name, and select a system name, respectively. Virtual buttons 812, 814, 816, and 818 may be operated to present suitable menus and interface displays for managing the attributes of HVAC system textual labels and zone textual labels.

Figure 9:
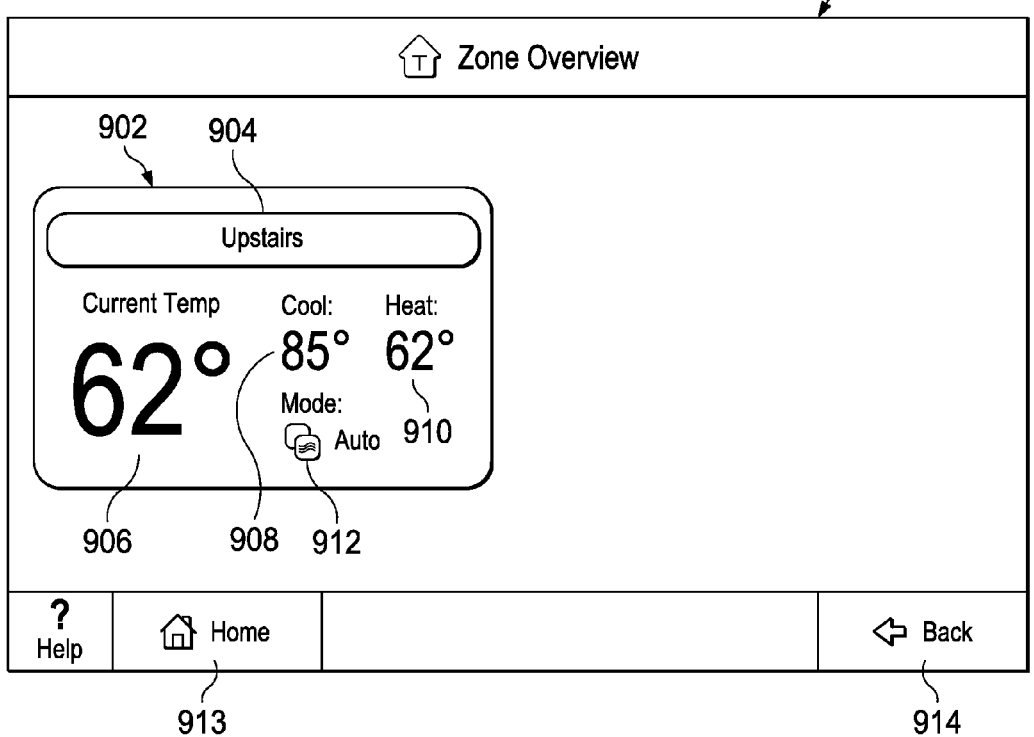
FIG. 9 is a zone overview of the system controller of the HVAC system of FIG. 1.

Referring now to FIG. 9, a zone overview 900 of the second system controller 328 is shown. The zone overview 900 comprises a graphical representation of the one or more HVAC zones for which the second system controller 328 is configured to control and/or monitor. In the embodiment shown in FIG. 9, the first system controller 328 is configured to operate in an independent state of operation wherein the second system controller 328 is configured to control and/or monitor HVAC zones of the second HVAC system 308. More particularly, FIG. 9 shows that the second system controller 328 is configured to control and/or monitor the upstairs 330. In the embodiment shown, the second system controller 328 displays an upstairs information group 902 as indicated by the upstairs title 904. The upstairs information group 902 comprises an upstairs current temperature 906, an upstairs cooling temperature set point 908, an upstairs heating temperature set point 910, and an upstairs mode indicia 912. Accordingly, the zone overview 900 may provide a user a convenient display for showing the operational and temperature status of the upstairs 330. The zone overview 900 comprises a virtual button 913 that may cause the second system controller 328 to display a home display substantially similar to the home display 400, but configured to display status and/or parameters of the second HVAC system 308. The zone overview 900 further comprises a virtual button 914 that may cause the second system controller 328 to resume display of a zone menu substantially similar to zone menu 600, but configured to display information related to second HVAC system 308.

Figure 10:
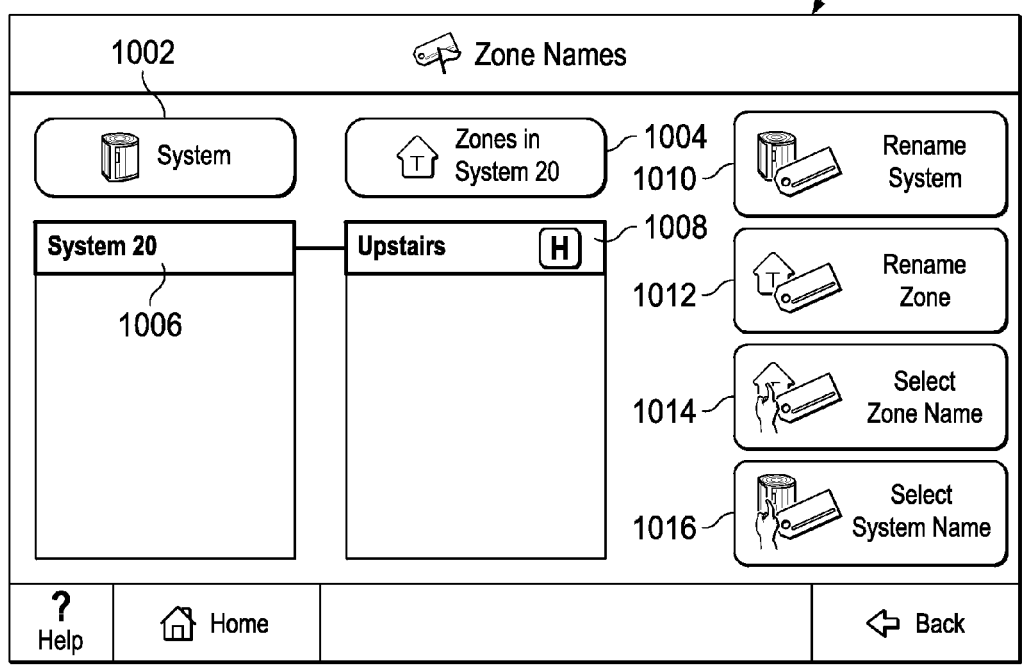
FIG. 10 is a zone names display of a second system controller of a second HVAC system.

Referring now to FIG. 10, a zone names display 1000 of the second system controller 328 is shown. The zone names display 1000 is substantially similar to the zone names display 800 of first system controller 316, but displays information related to the second HVAC system 308. The zone names display 1000 may provide a display of the systems and zone for which the second system controller 328 is configured to control and/or monitor. In some embodiments, the zone names display 1000 comprises a system column 1002 and a zones column 1004. While the second system controller 328 is in an independent state of operation, only the second HVAC system 308 is indicated in the system column 1002. In this embodiment, the second HVAC system 304 is represented by the second HVAC system textual label 1006 comprising the phrase, "System 20." With second HVAC system textual label 1006 selected, the zones column 1004 is populated with an upstairs textual label 1008. The zone names display 1000 further comprises virtual buttons 1010, 1012, 1014, and 1016 that may allow a user to rename an HVAC system textual label, rename a zone textual label, select a zone name, and select a system name, respectively. Virtual buttons 1010, 1012, 1014, and 1016 may be operated to present suitable menus and interface displays for managing the attributes of HVAC system textual labels and zone textual labels.

While FIGS. 7-10 demonstrate the operation of first and second system controllers 316, 328 as configured for an independent state of operation, FIGS. 11-15, discussed below, demonstrate how the first and second system controllers 316, 328 may be reconfigured to operate in a cooperative state of operation. In some embodiments, the first and second system controllers 316, 328 may be configured to operate in a cooperative state of operation by joining the first and second system controllers 316, 328 to the same wireless communication network via the wireless communication router 332.

Figure 11:
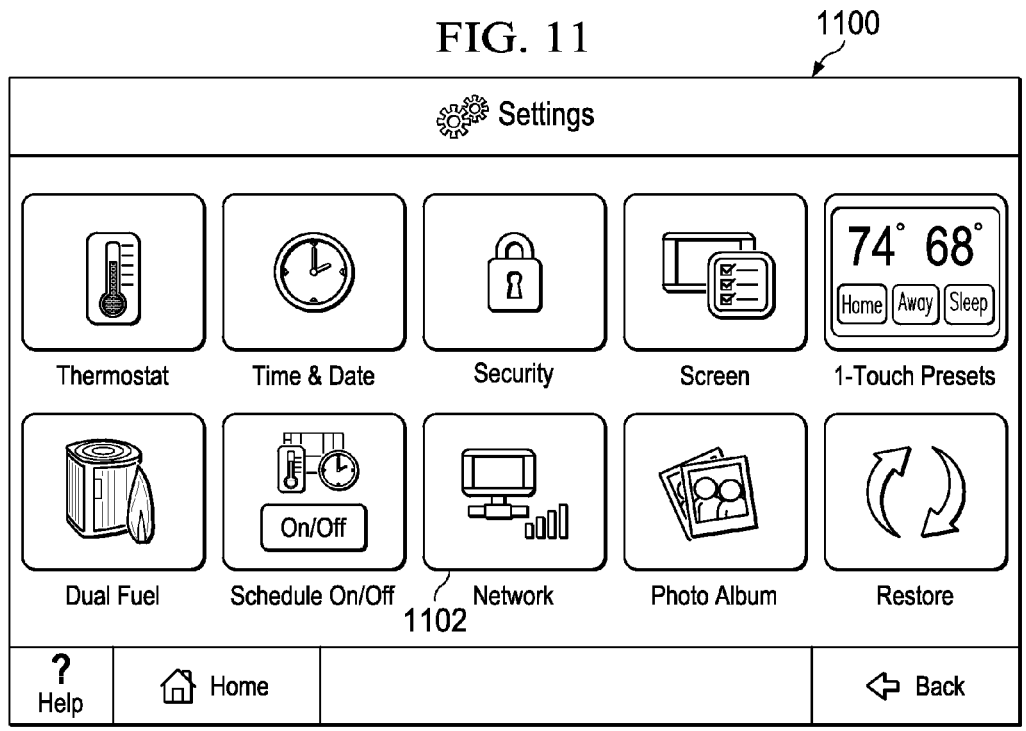
FIG. 11 is a settings menu of the system controller of the HVAC system of FIG. 1.

Referring now to FIG. 11, a settings menu 1100 that may be displayed in response to operation of a virtual button 504 of a main menu 500 of each of the first and second system controllers 316, 328 is shown. The settings menu 1100 may comprise a virtual button 1102.

Figure 12:
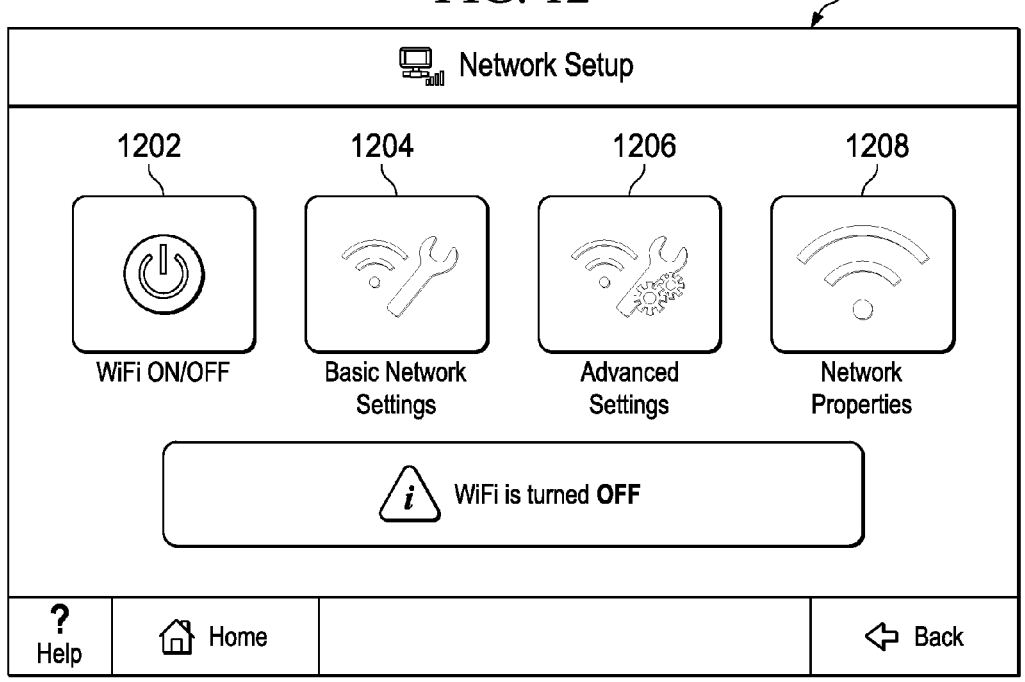
FIG. 12 is a network setup menu of the system controller of the HVAC system of FIG. 1.

Referring now to FIG. 12, a network setup menu 1200 that may be displayed in response to operation of the virtual button 1102 is shown. The network setup menu 1200 demonstrates that a wireless communication ability of the first and second system controllers 316, 328 is disabled. In some embodiments, the disabled wireless communication state may be represented graphically by a Wi-Fi on/off virtual button 1202 that appears unlit but otherwise available for selection. In some embodiments, the disabled wireless communication state may further be represented by a basic network settings virtual button 1204, an advanced settings virtual button 1206, and the network properties virtual button 1208 each being displayed but in a manner different than the manner in which the Wi-Fi on/off virtual button 1202 is displayed. The virtual buttons 1204, 1206, 1208 may be graphically displayed as being unavailable for selection as compared to virtual button 1202. For example, in some embodiments, the virtual buttons 1204, 1206, 1208 may appear in a so-called grayed-out manner. In some embodiments, the Wi-Fi on/off virtual button 1202 may be operated to selectively enable and disable wireless communication abilities of system controllers 316, 328. Specifically, Wi-Fi on/off virtual button 1202 may be operated to turn on wireless communication abilities of the system controllers, and as a result, changing a state of display of the virtual buttons 1204, 1206, and 1208.

Figure 13:
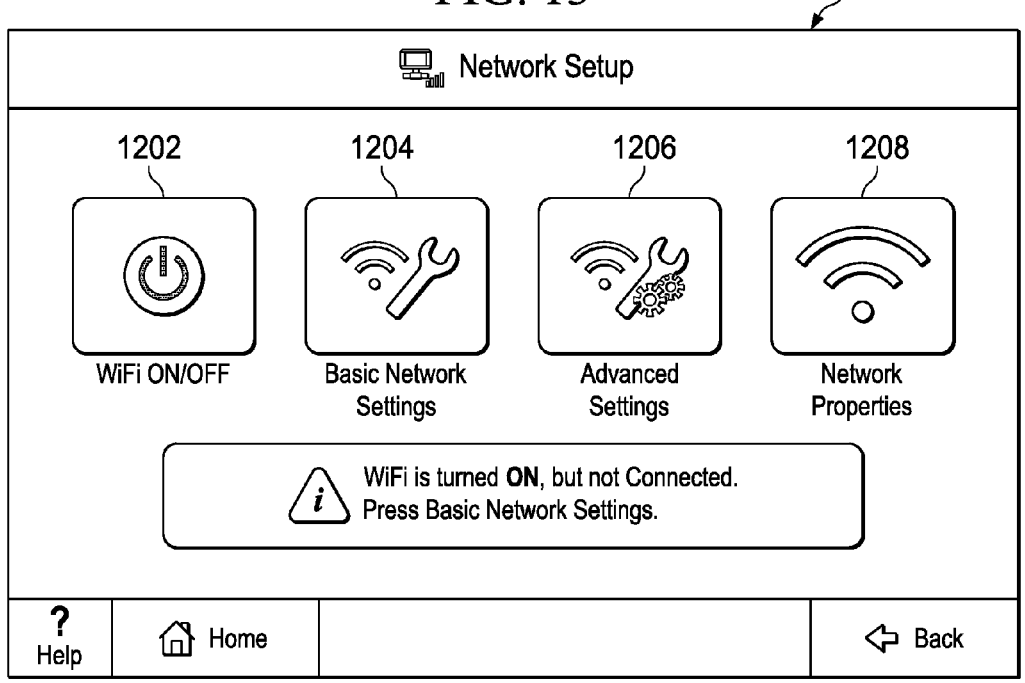
FIG. 13 is another network setup menu of the system controller of the HVAC system of FIG. 1.

Referring to FIG. 13, a network setup menu 1201 that may be displayed in response to operation of the virtual button 1202 is shown. As mentioned above, display of the virtual buttons 1204, 1206, and 1208 is different from the manner in which they are displayed in FIG. 12. More specifically, in some embodiments, the virtual buttons 1204, 1206, and 1208 may no longer appear grayed-out, but rather, may appear as being selectable. As such, a user may select the basic network settings virtual button 1204 to select a wireless network with which the user may cause the first and second system controllers 316, 328 to join.

Figure 14:
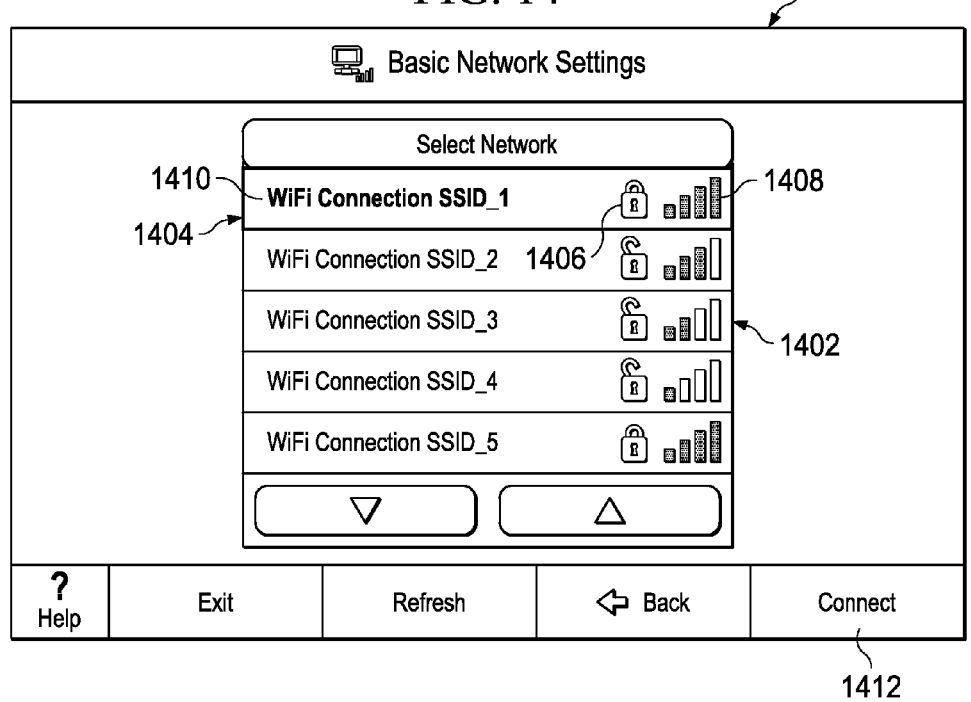
FIG. 14 is a basic network settings display of the system controller of the HVAC system of FIG. 1.

Referring now to FIG. 14, a basic network settings display 1400 that may be displayed in response to operation of the virtual button 1204 is shown. The basic network settings display 1400 provides a list 1402 of detected wireless networks. The list 1402 comprises a wireless network name column 1404, a security column 1406, and a signal strength column 1408. A user may cause the system controllers 316, 328 to join the first listed wireless network by selecting the virtual button 1410 comprising the text "WIFI Connection SSID_1" and thereafter operating the virtual button 1412.

Figure 15:
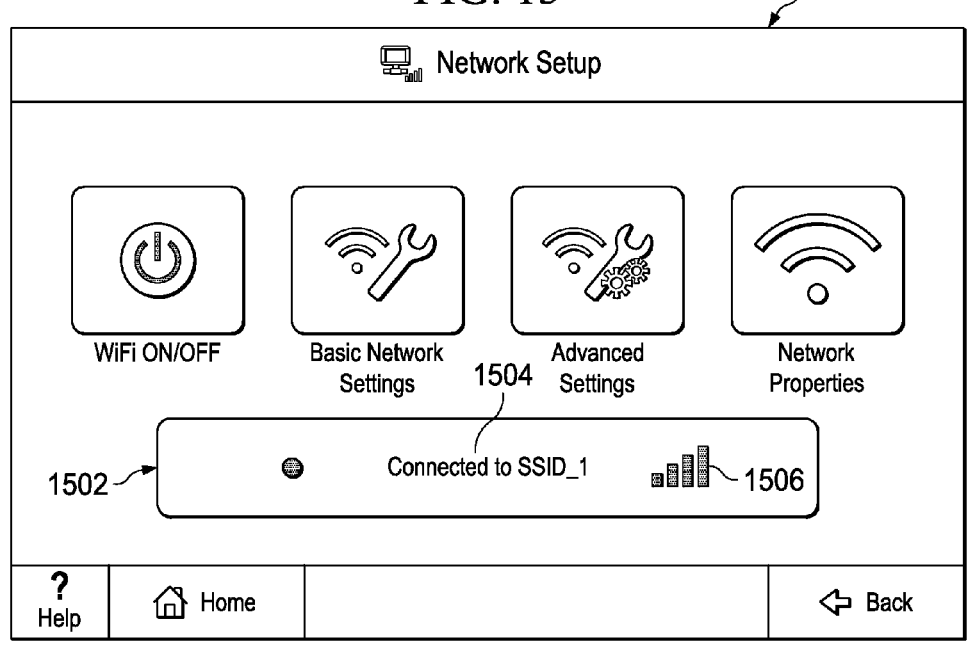
FIG. 15 is another network setup menu of the system controller of the HVAC system of FIG. 1.

Referring now to FIG. 15, a network setup menu 1500 may automatically be displayed in response to the system controllers 316, 328 joining the selected wireless network. Successful connection to the selected wireless network may be indicated in a network status display 1502 comprising the network name 1504 of the network to which the system controllers 316, 328 are connected and a signal strength graphical indicator 1506. After such successful joining of the system controllers 316, 328 to a same wireless network via wireless communication router 332, the system controllers 316, 328 may, in some embodiments, automatically become mutually discoverable via wireless network. Such mutual discoverability may, in some embodiments, cause each of the system controllers 316, 328 to add control and/or monitoring capabilities of the zones of the other HVAC system. Specifically, in some embodiments, when successful wireless communication is established the between the first system controller 316 and the second system controller 328 (1) the first system controller 316 may become configured to control and/or monitor the upstairs 330 in addition to the main floor 320 and the family room 322 and (2) the second system controller 328 may become configured to control and/or monitor one or more of the main floor 320 and the family room 322 in addition to the upstairs 330.

Figure 16:
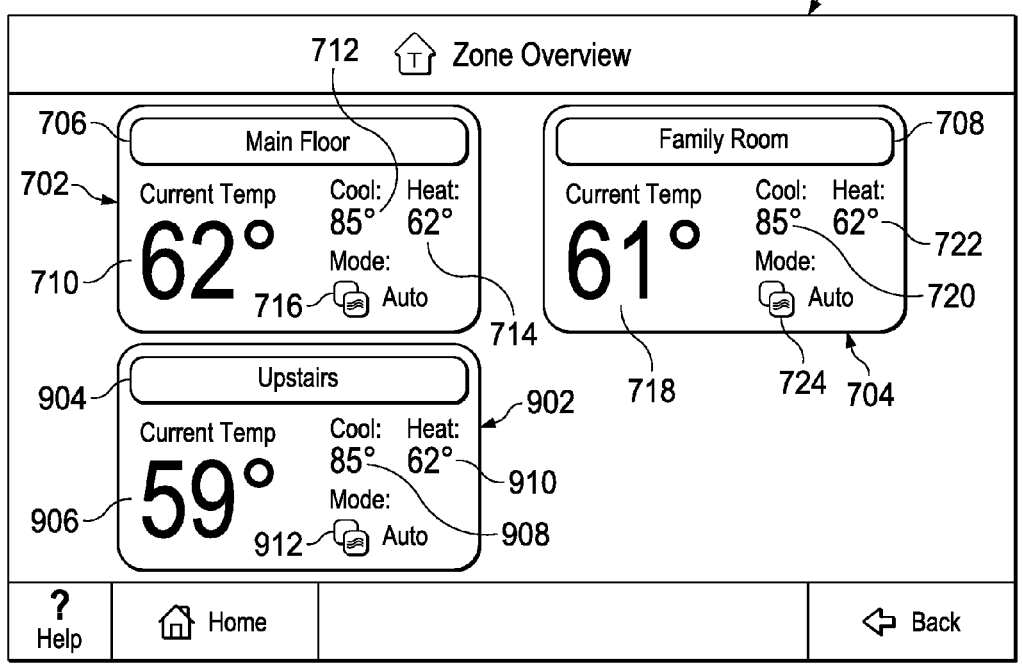
FIG. 16 is another zone overview of the system controller of the HVAC system of FIG. 1.

Referring now to FIG. 16, a zone overview 1600 of system controller 316 is shown. The zone overview 1600 is shown while the first system controller 316 is in a cooperative mode of operation and is cooperating with second system controller 328 to allow the first system controller 316 to control and/or monitor the upstairs 330. Accordingly, the zone overview 1600 comprises information related to all zones of the first HVAC system 304 and all zones of the second HVAC system 308 so that the zone overview 1600 comprises information of both FIGS. 7 and 9.

Figure 17:
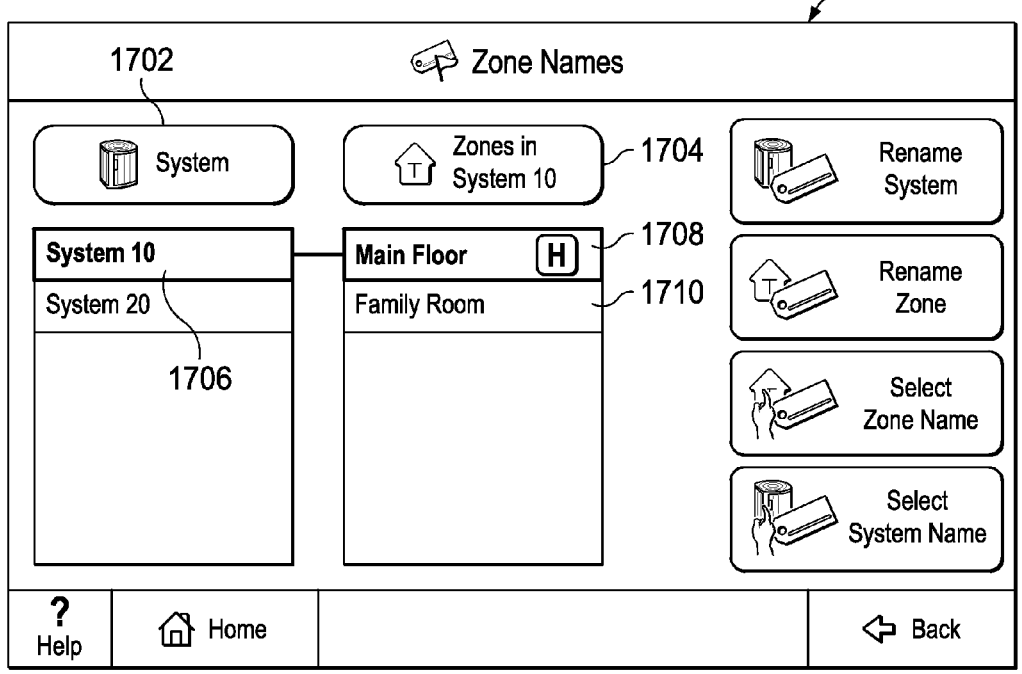
FIG. 17 is another zone names display of the system controller of the HVAC system of FIG. 1.

Referring now to FIG. 17, a zone names display 1700 comprises system column 1702 and a zones column 1704. Because the first system controller 316 is in a cooperative state of operation, both the first HVAC system 304 and the second HVAC system 308 are indicated in the system column 1702. Zone names display 1700 shows that when first HVAC system textual label 1706 is selected, the zones column 1702 is populated with main floor textual label 1708 and a family room textual label 1710.

Figure 18:
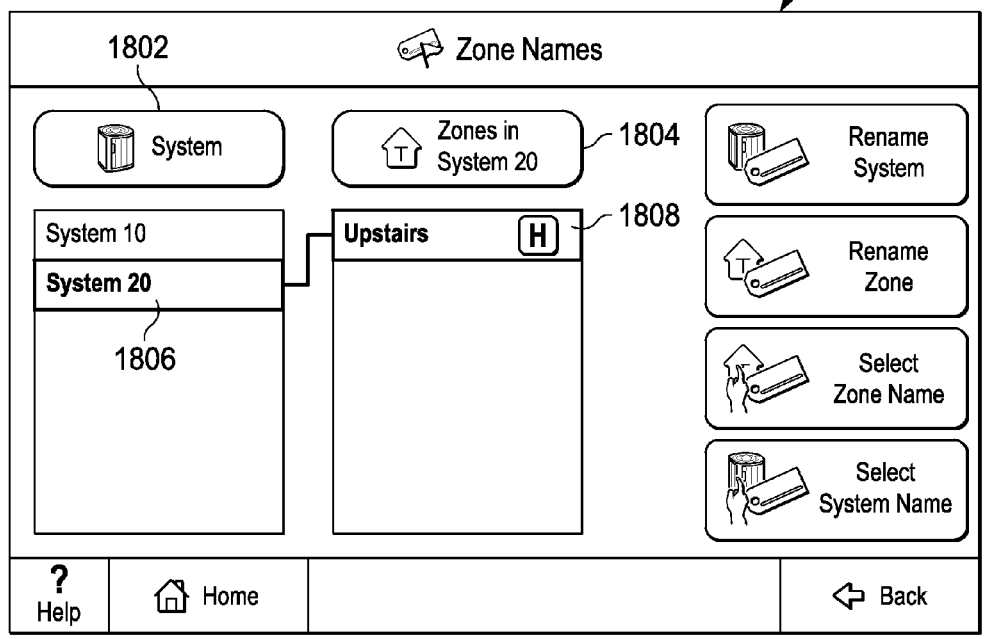
FIG. 18 is another zone names display of the system controller of the HVAC system of FIG. 1.

Referring now to FIG. 18, a zone names display 1800 comprises system column 1802 and a zones column 1804. Because the first system controller 316 is in a cooperative state of operation, both the first HVAC system 304 and the second HVAC system 308 are indicated in the system column 1702. Zone names display 1800 shows that when second HVAC system textual label 1806 is selected, the zones column 1802 is populated with upstairs textual label 1808.

It will be appreciated that the displays 1600, 1700, and 1800 may be provided by each of first system controller 316 and second system controller 328 as a result of the system controllers 316, 328 being configured to operate in the cooperative state of operation, the cooperation comprising wireless communication via the wireless communication router 332. Accordingly, in some embodiments, the zone selectors 412 of the home display 400 of the first system controller 316 may allow a user to selectively scroll through a list of all zones of the first HVAC system 304 and the second HVAC system 308 to allow the user to control and/or monitor any of the zones of the multiple HVAC systems 304, 308. Similarly, in some embodiments, zone selectors of a home display of the second system controller 328 may allow a user to selectively scroll through a list of all zones of the second HVAC system 308 and the first HVAC system 304 to allow the user to control and/or monitor any of the zones of the multiple HVAC system 304, 308.

In some embodiments, the degree to which system controllers 316, 328 control and/or monitor the HVAC system 304, 308 to which they are not directly wired may be determined by a user or otherwise may be varied. For example, the first system controller 316 may be configured to control and monitor the second HVAC system 308 while the second system controller 328 may be configured to monitor but not control the first HVAC system 304. Similarly, the system controllers 316, 328 may be configured to receive and/or display only selected status alerts and/or messages or to refrain from receiving and/or displaying selected status alerts and/or messages of the HVAC system to which they are not directly wired. Further, in some embodiments, the system controllers 316, 328 may comprise user interfaces configured to allow a user to group zones of various HVAC systems so that the user-created group of zones may be controlled, monitored, and/or otherwise managed as a group. In some embodiments, a zone may be associated with a designated space or location particularly served by a zone damper or other controlled device, while in other embodiments, a zone may simply be an area of a structure regardless of any association of the area with a particular controllable device.

Figure 19:
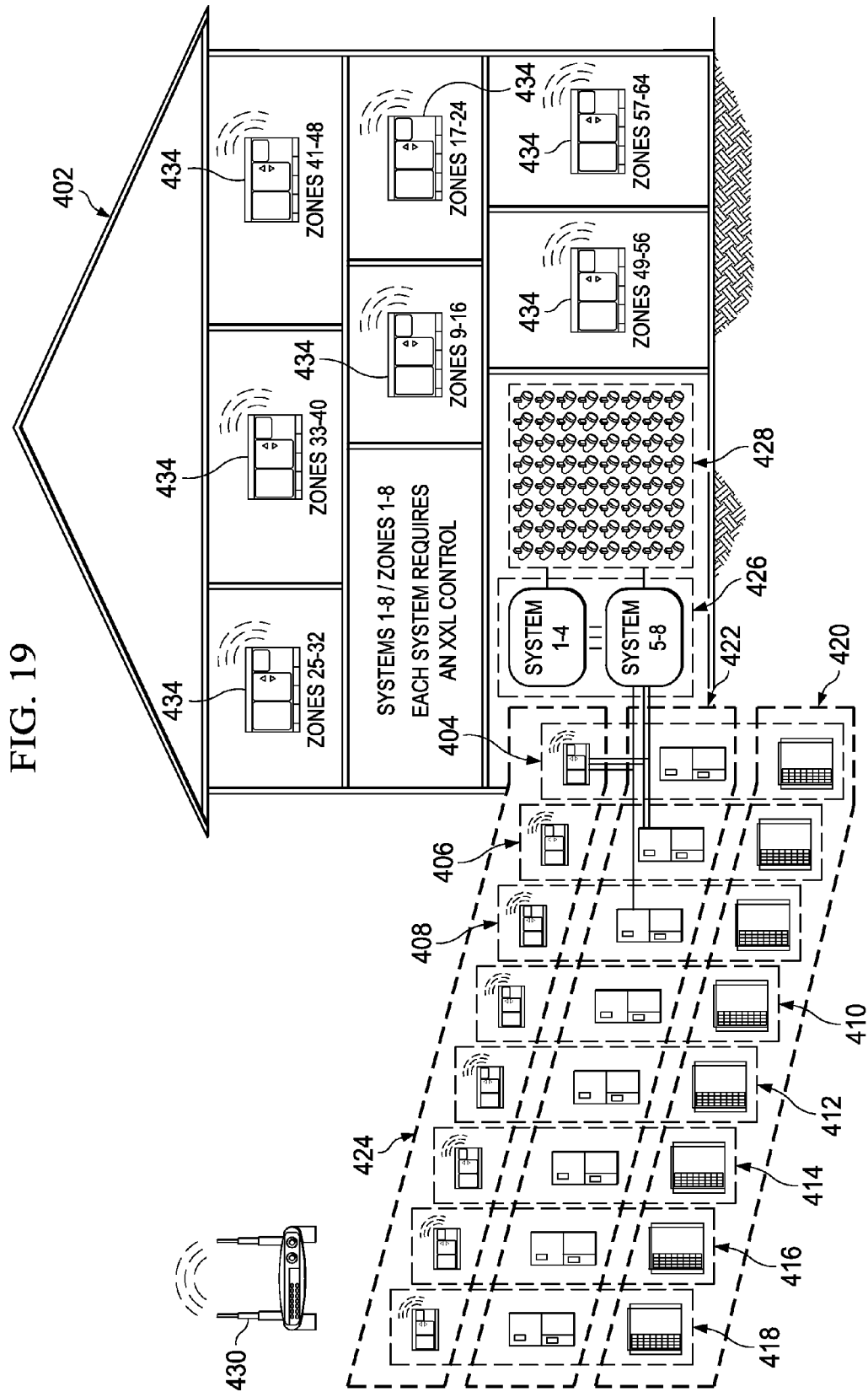
FIG. 19 is a simplified schematic representation of an integrated HVAC system according to an embodiment of this disclosure.

Referring now to FIG. 19, a simplified schematic diagram of an integrated HVAC system 400 is shown as associated with a structure 402. Integrated HVAC system 400 comprises first, second, third, fourth, fifth, sixth, seventh, and eighth HVAC subsystems, 404, 406, 408, 410, 412, 414, 416, and 418, respectively. Each HVAC subsystem 404, 406, 408, 410, 412, 414, 416, and 418 comprises an outdoor unit, an indoor unit, and a controller that is hardwired to the outdoor unit and the indoor unit of the same system. In FIG. 19, the outdoor units are collectively labeled as 420, the indoor units are collectively labeled as 422, and controllers are collectively labeled as 424. Each of the outdoor units 420 is substantially similar to outdoor unit 104, each of the indoor units 422 is substantially similar to indoor unit 102, and each controller 424 is substantially similar to controller 124. In this embodiment, each subsystem 404, 406, 408, 410, 412, 414, 416, 418 is further connected to at least one of two zone panels 426 so that each subsystem 404, 406, 408, 410, 412, 414, 416, 418 may communicate via the zone panels 426 to control up to eight supply dampers 428. Integrated HVAC system 400 further comprises a wireless communication router 430 substantially similar to wireless communication router 332. The integrated HVAC system 400 may further comprise a plurality of wireless zone thermostats 434, each configured to provide control of up to eight zones as well as to provide, in this embodiment, seven additional locations at which portions of the integrated HVAC system 400 may be controlled.

In this embodiment, a each of the subsystems 404, 406, 408, 410, 412, 414, 416, 418 is configured to communicate with each of the other subsystems via the wireless communication router 430. For example, HVAC subsystem 404 may be configured to communicate with each of systems 406, 408, 410, 412, 414, 416. As such, a user interface of the controller 404 may be configured to control any of the 64 zones of FIG. 19. In some embodiments, one or more of the controllers 430 may be used to generate groups having group names, the groups consisting of zones serviced by one or more of the subsystems 404, 406, 408, 410, 412, 414, 416, 418. In some embodiments, a system controller 424 may be limited to controlling only eight zones without the need for a user to reconfigure the system controller 424. According to the above, this disclosure provides an HVAC system controller that may control a plurality of HVAC systems and/or HVAC subsystems and the plurality of zones associated with those systems and/or subsystems. Of course, in other embodiments, a number of subsystems and zones a system controller 424 may be capable of monitoring and/or controlling may be unlimited.

Figure 20:
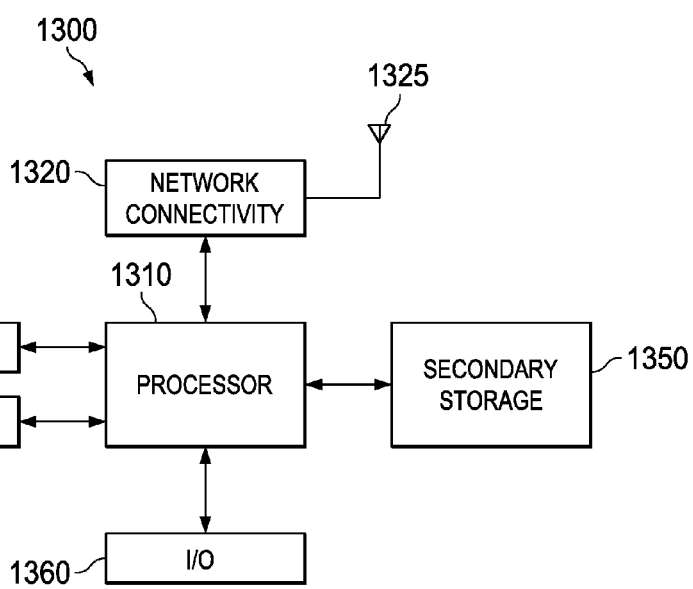
FIG. 20 is a simplified representation of a general-purpose processor (e.g., electronic controller or computer) system suitable for implementing the embodiments of the disclosure.

Referring now to FIG. 20, the HVAC system 100 and/or other disclosed components may comprise one or more processing components capable of executing instructions related to the methods and/or operations described previously. The processing component may be a component of a computer system. FIG. 12 illustrates a typical, general-purpose processor (e.g., electronic controller or computer)

system 1300 that includes a processing component 1310 suitable for implementing one or more embodiments disclosed herein. In addition to the processor 1310 (which may be referred to as a central processor unit or CPU), the system 1300 might include network connectivity devices 1320, random access memory (RAM) 1330, read only memory (ROM) 1340, secondary storage 1350, and input/output (I/O) devices 1360. In some cases, some of these components may not be present or may be combined in various combinations with one another or with other components not shown. These components might be located in a single physical entity or in more than one physical entity. Any actions described herein as being taken by the processor 1310 might be taken by the processor 1310 alone or by the processor 1310 in conjunction with one or more components shown or not shown in the drawing.

The processor 1310 executes instructions, codes, computer programs, or scripts that it might access from the network connectivity devices 1320, RAM 1330, ROM 1340, or secondary storage 1350 (which might include various disk-based systems such as hard disk, floppy disk, optical disk, or other drive). While only one processor 1310 is shown, multiple processors may be present. Thus, while instructions may be discussed as being executed by a processor, the instructions may be executed simultaneously, serially, or otherwise by one or multiple processors. The processor 1310 may be implemented as one or more CPU chips.

The network connectivity devices 1320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1320 may enable the processor 1310 to communicate with the Internet or one or more telecommunications networks or other networks from which the processor 1310 might receive information or to which the processor 1310 might output information.

The network connectivity devices 1320 might also include one or more transceiver components 1325 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 1325 might include separate receiving and transmitting units or a single transceiver. Information transmitted or received by the transceiver 1325 may include data that has been processed by the processor 1310 or instructions that are to be executed by processor 1310. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 1330 might be used to store volatile data and perhaps to store instructions that are executed by the processor 1310. The ROM 1340 is a non-volatile memory device that typically has a smaller memory capacity than the memory capacity of the secondary storage 1350. ROM 1340 might be used to store instructions and perhaps data that are read during execution of the instructions. Access to both RAM 1330 and ROM 1340 is typically faster than to secondary storage 1350. The secondary storage 1350 is typically comprised of one or more disk drives or tape drives and might be used for non-volatile storage of data or as an over-flow data storage device if RAM 1330 is not large enough to hold all working data. Secondary storage 1350 may be used to store programs or instructions that are loaded into RAM 1330 when such programs are selected for execution or information is needed.

The I/O devices 1360 may include liquid crystal displays (LCDs), touch screen displays, keyboards, keypads, switches, dials, mice, track balls, voice recognizers, card readers, paper tape readers, printers, video monitors, transducers, sensors, or other well-known input or output devices. Also, the transceiver 1325 might be considered to be a component of the I/O devices 1360 instead of or in addition to being a component of the network connectivity devices 1320. Some or all of the I/O devices 1360 may be substantially similar to various components disclosed herein.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: $R=Rl+k*(Ru-Rl)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. An HVAC control system, comprising:
a first system controller associated with a first HVAC system and configured to control the first HVAC system, wherein the first system controller is located in a first zone conditioned by the first HVAC system; and
a second system controller associated with a second HVAC system and configured to control the second HVAC system, wherein the second system controller is located in a second zone conditioned by the second HVAC system;
wherein the first system controller is selectively operable to control the second HVAC system;
wherein the first system controller comprises a user interface configured to simultaneously display (1) a first zone indicator, a first condition, and a first operating parameter of the first zone associated with the first HVAC system and (2) a second zone indicator, a second condition, and a second operating parameter of the second zone associated with the second HVAC system;
wherein the user interface is configured to selectively receive an input to adjust at least one of the (1) at least one of the first condition and the first operating parameter of the first zone associated with the first HVAC system and (2) at least one of the second condition and the second operating parameter of the second zone associated with the second HVAC system to cause (1) the first system controller to operate the first HVAC system in accordance with at least one of the adjusted first condition and the adjusted first operating parameter when the simultaneously displayed at least one of the first condition and the first operating parameter of the first zone associated with the first HVAC system is adjusted, wherein at least one of the adjusted first condition and the adjusted first operating parameter comprises a different value with respect to the second condition and the second operating parameter, respectively, and (2) the second system controller to display on a user interface of the second controller at least one of the adjusted second condition and the adjusted second operating parameter and operate the second HVAC system in accordance with at least one of the adjusted second condition and the adjusted second operating parameter when the simultaneously displayed at least one of the second condition and the second operating parameter of the second zone associated with the second HVAC system is adjusted, wherein at least one of the adjusted second condition and the adjusted second operating parameter comprises a different value with respect to the first condition and the first operating parameter, respectively.

2. The HVAC control system of claim 1, wherein the first HVAC system is inoperable without the first system controller.

3. The HVAC control system of claim 1, wherein the second HVAC system is inoperable without the second system controller.

4. The HVAC control system of claim 1, wherein the first HVAC system is inoperable without the first system controller, and wherein the second HVAC system is inoperable without the second system controller.

5. The HVAC control system of claim 1, wherein the first system controller is connected to the first HVAC system via a first wired communication connection, wherein the second system controller is connected to the second HVAC system via a second wired communication connection, and wherein the first wired communication connection is a separate communication bus from the second wired communication connection.

6. The HVAC control system of claim 1, wherein the first system controller and the second system controller selectively communicate with each other via a wireless connection.

7. The HVAC control system of claim 1, wherein the first system controller and the second system controller selectively communicate with each other via a wireless communication router.

8. The HVAC control system of claim 1, wherein the first system controller is selectively configurable to at least one of control an operating parameter of the second HVAC system and monitor the second HVAC system.

9. A method of controlling multiple HVAC systems, comprising:
providing a first HVAC system comprising a required first system controller located in a first zone conditioned by the first HVAC system;
providing a second HVAC system comprising a required second system controller located in a second zone conditioned by the second HVAC system;
operating the first HVAC system to condition the first zone in accordance with at least one of a first condition and a first operating parameter;
operating the second HVAC system to condition a second zone in accordance with at least one of a second condition and a second operating parameter;
simultaneously displaying on a user interface of the first controller (1) a first zone indicator, the first condition, and the first operating parameter of the first zone associated with the first HVAC system and (2) a second zone indicator, the second condition, and the second operating parameter of the second zone associated with the second HVAC system;
selectively receiving an input via the user interface of the first controller to adjust at least one of (1) at least one of the first condition and the first operating parameter of the first zone associated with the first HVAC system and (2) at least one of the second condition and the second operating parameter of the second zone associated with the second HVAC system to cause (1) the first HVAC system to operate in accordance with at least one of the adjusted first condition and the adjusted first operating parameter when the simultaneously displayed at least one of the first condition and the first operating parameter of the first zone associated with the first HVAC system is adjusted, wherein at least one of the adjusted first condition and the adjusted first operating parameter comprises a different value with respect to the second condition and the second operating parameter, respectively, and (2) the second HVAC system to operate in accordance with at least one of the adjusted second condition and the adjusted second operating parameter when the simultaneously displayed at least one of the second condition and the second operating parameter of the second zone associated with the second HVAC system is adjusted, wherein at least one of the adjusted second condition and the adjusted second operating parameter comprises a different value with respect to the first condition and the first operating parameter, respectively;
enabling wireless communication between the first system controller and the second system controller;

communicating at least one of the adjusted second condition and the adjusted second operating parameter from the first system controller to the second system controller; and displaying on a user interface of the second controller at least one of the adjusted second condition and the adjusted second operating parameter.

10. The method of claim 9, further comprising:
routing the wireless communication between the first system controller and the second system controller through a wireless communication router.

11. The method of claim 9, further comprising:
operating the first system controller to view a temperature set point of the second zone.

12. The method of claim 9, further comprising:
operating the first system controller to alter a temperature set point of the second zone.

13. The method of claim 9, wherein the wireless communication router is configured to assign network addresses to the first system controller and the second system controller.

14. The method of claim 13, wherein the wireless router is further configured to communicate with an off-premises device.

15. An HVAC system, comprising:
a first air conditioning system comprising a first wired system controller located in a first zone conditioned by the first air conditioning system and configured to control the first air conditioning system via a first wired communication bus; and
a second air conditioning system comprising a second wired system controller located in a second zone conditioned by the second air conditioning system and configured to control the second air conditioning system via a second wired communication bus;
wherein each of the first wired system controller and the second wired system controller are configured for selective wireless communication with each other using wireless communication protocol;
wherein the first wired system controller comprises a user interface configured to simultaneously display (1) a first zone indicator, a first condition, and a first operating parameter of the first zone associated with the first HVAC system and (2) a second zone indicator, a second condition, and a second operating parameter of the second zone associated with the second HVAC system; and
wherein the user interface is configured to selectively receive an input to adjust (1) at least one of the first condition and the first operating parameter of the first zone associated with the first HVAC system and (2) at least one of the second condition and the second operating parameter of the second zone associated with the second HVAC system to cause (1) the first air conditioning system to operate in accordance with at least one of the adjusted first condition and the adjusted first operating parameter when the simultaneously displayed at least one of the first condition and the first operating parameter of the first zone associated with the first air conditioning system is adjusted, wherein at least one of the adjusted first condition and the adjusted first operating parameter comprises a different value with respect to the second condition and the second operating parameter, respectively, and (2) the second air conditioning system to operate in accordance with at least one of the adjusted second condition and the adjusted second operating parameter when the simultaneously displayed at least one of the second condition and the second operating parameter of the second zone associated with the second air conditioning system is adjusted, wherein at least one of the adjusted second condition and the adjusted second operating parameter comprises a different value with respect to the first condition and the first operating parameter, respectively.

16. The HVAC system of claim 15, wherein the selective wireless communication comprises routing wireless communication through a wireless communication router.

17. The HVAC system of claim 15, wherein the selective wireless communication comprises an exchange of at least one of (1) the first condition and the first operating parameter and (2) the second condition and the second operating parameter.

18. The HVAC system of claim 15, wherein the first wired system controller is configured to selectively control the second air conditioning system as if the second wired system controller were being used to control the second air conditioning system.

19. The HVAC system of claim 15, wherein during wireless communication between the first wired system controller and the second wired system controller, each of the first wired system controller and the second wired system controller are configured to selectively unilaterally discontinue the wireless communication.

20. The HVAC system of claim 15, wherein the first wired system controller is configured to at least one of control and monitor at least one of the second condition and the second operating parameter of the second zone.

21. An HVAC control system, comprising:
a first system controller configured to control a first HVAC system and located in a first zone conditioned by the first HVAC system; and
a second system controller configured to control a second HVAC system and located in a second zone conditioned by the second HVAC system;
wherein the first system controller is configured to simultaneously display a zone information group for each zone conditioned by either the first HVAC system or the second HVAC system, wherein each zone information group comprises a zone indicator, a zone mode indicia, a current temperature associated with the respective zone, and at least one temperature set point associated with the respective zone; and
wherein the first controller is configured to selectively receive an input to adjust the temperature set point of the first zone and the temperature set point of the second zone to cause (1) the first HVAC system to operate in accordance with the adjusted temperature set point of the first zone when the temperature set point of the first zone is adjusted, wherein the adjusted first temperature set point of the first zone comprises a different value than the temperature set point of the second zone and (2) the second HVAC to operate in accordance with the adjusted second temperature set point when the second temperature set point of the second zone is adjusted, wherein the adjusted second temperature set point of the second zone comprises a different value than the temperature set point of the first zone.

* * * * *

UNITED STATES PATENT AND TRADEMARK OFFICE
CERTIFICATE OF CORRECTION

PATENT NO. : 9,494,952 B2
APPLICATION NO. : 13/077269
DATED : November 15, 2016
INVENTOR(S) : Timothy Wayne Storm et al.

Page 1 of 1

It is certified that error appears in the above-identified patent and that said Letters Patent is hereby corrected as shown below:

In the Specification

Column 3, Line 54 replace "configured a" with --configured as a--

Column 9, Line 16 replace "controller 328 and" with --controller 328 may--

Column 9, Line 51 replace "that indicates zone" with --that indicates the zone--

Column 10, Line 9 replace "display" with --displays--

Column 10, Line 20 replace "is in configured" with --is configured--

Column 10, Line 51 replace "zone" with --zones--

Column 11, Line 38 replace "zone" with --zones--

Column 14, Line 40 replace "a each of" with --each of--

In the Claims

Claim 21, Column 20, Line 58 replace "second HVAC" with --second HVAC system--

Signed and Sealed this
Fourth Day of April, 2017

Michelle K. Lee
*Director of the United States Patent and Trademark Office*